(12) United States Patent
Kothari

(10) Patent No.: US 8,638,491 B2
(45) Date of Patent: *Jan. 28, 2014

(54) DEVICE HAVING A CONDUCTIVE LIGHT ABSORBING MASK AND METHOD FOR FABRICATING SAME

(75) Inventor: Manish Kothari, Cupertino, CA (US)

(73) Assignee: Qualcomm Mems Technologies, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/571,130

(22) Filed: Aug. 9, 2012

(65) Prior Publication Data

US 2012/0299886 A1 Nov. 29, 2012

Related U.S. Application Data

(60) Continuation of application No. 13/251,009, filed on Sep. 30, 2011, now Pat. No. 8,243,360, which is a continuation of application No. 13/010,665, filed on Jan. 20, 2011, now Pat. No. 8,035,883, which is a continuation of application No. 12/426,168, filed on Apr. 17, 2009, now Pat. No. 7,889,415, which is a continuation of application No. 11/925,692, filed on Oct. 26, 2007, now Pat. No. 7,542,198, which is a division of application No. 11/119,432, filed on Apr. 29, 2005, now Pat. No. 7,420,725.

(60) Provisional application No. 60/613,480, filed on Sep. 27, 2004.

(51) Int. Cl.
*G02B 26/00* (2006.01)
*G02B 26/02* (2006.01)
*G02B 26/08* (2006.01)

(52) U.S. Cl.
CPC ................................ *G02B 26/0841* (2013.01)
USPC ......................................... 359/290; 359/230

(58) Field of Classification Search
USPC .......................... 359/230, 247, 290, 291, 302
See application file for complete search history.

(56) References Cited

U.S. PATENT DOCUMENTS 2,534,846 A 12/1950 Ambrose
2,590,906 A 4/1952 Tripp
(Continued)

FOREIGN PATENT DOCUMENTS

DE 4108966 A1 9/1992
DE 10228946 A1 1/2004
(Continued)

OTHER PUBLICATIONS

Billard, Tunable Capacitor, 5th Annual Review of LETI, Jun. 24, 2003, p. 7.

(Continued)

*Primary Examiner* — William Choi
(74) *Attorney, Agent, or Firm* — Knobbe Martens Olson & Bear LLP

(57) ABSTRACT

A system and method for an optical component that masks non-active portions of a display and provides an electrical path for one or more display circuits. In one embodiment an optical device includes a substrate, a plurality of optical elements on the substrate, each optical element having an optical characteristic which changes in response to a voltage applied to the optical element, and a light-absorbing, electrically-conductive optical mask disposed on the substrate and offset from the plurality of optical elements, the optical mask electrically coupled to one or more of the optical elements to provide electrical paths for applying voltages to the optical elements. In another embodiment, a method of providing an electrical signal to optical elements of a display comprises electrically coupling an electrically-conductive light-absorbing mask to one or more optical elements, and applying a voltage to the mask to activate the one or more optical elements.

20 Claims, 13 Drawing Sheets

(56) References Cited

U.S. PATENT DOCUMENTS

| | | |
|---|---|---|
| 2,677,714 A | 5/1954 | Auwarter |
| 3,037,189 A | 5/1962 | Barrett et al. |
| 3,210,757 A | 10/1965 | Jacob |
| 3,247,392 A | 4/1966 | Thelen |
| 3,296,530 A | 1/1967 | Brooks |
| 3,439,973 A | 4/1969 | Bernt |
| 3,443,854 A | 5/1969 | Herbert |
| 3,653,741 A | 4/1972 | Marks |
| 3,656,836 A | 4/1972 | De Cremoux et al. |
| 3,679,313 A | 7/1972 | Rosenberg |
| 3,701,586 A | 10/1972 | Goetz |
| 3,725,868 A | 4/1973 | Malmer et al. |
| 3,728,030 A | 4/1973 | Hawes |
| 3,813,265 A | 5/1974 | Marks |
| 3,886,310 A | 5/1975 | Guldberg |
| 3,955,190 A | 5/1976 | Teraishi |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,287,449 A | 9/1981 | Takeda et al. |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,497,974 A | 2/1985 | Deckman et al. |
| 4,498,953 A | 2/1985 | Cook et al. |
| 4,500,171 A | 2/1985 | Penz et al. |
| 4,518,959 A | 5/1985 | Ueda et al. |
| 4,519,676 A | 5/1985 | te Velde |
| 4,531,126 A | 7/1985 | Sadones |
| 4,560,435 A | 12/1985 | Brown et al. |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,626,840 A | 12/1986 | Glasper et al. |
| 4,655,554 A | 4/1987 | Armitage |
| 4,662,746 A | 5/1987 | Hornbeck |
| 4,663,083 A | 5/1987 | Marks |
| 4,666,254 A | 5/1987 | Itoh et al. |
| 4,681,403 A | 7/1987 | te Velde et al. |
| 4,705,361 A | 11/1987 | Frazier et al. |
| 4,710,732 A | 12/1987 | Hornbeck |
| 4,748,366 A | 5/1988 | Taylor |
| 4,779,959 A | 10/1988 | Saunders |
| 4,786,128 A | 11/1988 | Birnbach |
| 4,790,635 A | 12/1988 | Apsley |
| 4,822,993 A | 4/1989 | Dillon et al. |
| 4,856,863 A | 8/1989 | Sampsell et al. |
| 4,857,978 A | 8/1989 | Goldburt et al. |
| 4,859,060 A | 8/1989 | Katagiri et al. |
| 4,864,290 A | 9/1989 | Waters |
| 4,900,136 A | 2/1990 | Goldburt et al. |
| 4,900,395 A | 2/1990 | Syverson et al. |
| 4,925,259 A | 5/1990 | Emmett |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,973,131 A | 11/1990 | Carnes |
| 4,980,775 A | 12/1990 | Brody |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,062,689 A | 11/1991 | Koehler |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,091,983 A | 2/1992 | Lukosz |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,164,858 A | 11/1992 | Aguilera, Jr. et al. |
| 5,168,406 A | 12/1992 | Nelson |
| 5,170,156 A | 12/1992 | DeMond et al. |
| 5,170,283 A | 12/1992 | O'Brien et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,206,632 A | 4/1993 | Dupont et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,285,196 A | 2/1994 | Gale |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,315,370 A | 5/1994 | Bulow |
| 5,323,002 A | 6/1994 | Sampsell et al. |
| 5,324,683 A | 6/1994 | Fitch et al. |
| 5,325,116 A | 6/1994 | Sampsell |
| 5,326,426 A | 7/1994 | Tam et al. |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | Van Wijk |
| 5,381,253 A | 1/1995 | Sharp et al. |
| 5,401,983 A | 3/1995 | Jokerst et al. |
| 5,405,490 A | 4/1995 | Park et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,452,138 A | 9/1995 | Mignardi et al. |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,461,516 A | 10/1995 | Kawano et al. |
| 5,471,341 A | 11/1995 | Warde et al. |
| 5,474,865 A | 12/1995 | Vasudev |
| 5,489,952 A | 2/1996 | Gove et al. |
| 5,497,197 A | 3/1996 | Gove et al. |

(56) References Cited

U.S. PATENT DOCUMENTS

| | | |
|---|---|---|
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,544,268 A | 8/1996 | Bischel et al. |
| 5,548,301 A | 8/1996 | Kornher et al. |
| 5,550,373 A | 8/1996 | Cole et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,561,523 A | 10/1996 | Blomberg et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,614,937 A | 3/1997 | Nelson |
| 5,619,059 A | 4/1997 | Li et al. |
| 5,619,365 A | 4/1997 | Rhoads et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,636,052 A | 6/1997 | Arney et al. |
| 5,636,185 A | 6/1997 | Brewer et al. |
| 5,638,084 A | 6/1997 | Kalt |
| 5,638,946 A | 6/1997 | Zavracky |
| 5,641,391 A | 6/1997 | Hunter et al. |
| 5,646,729 A | 7/1997 | Koskinen et al. |
| 5,646,768 A | 7/1997 | Kaeriyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,661,591 A | 8/1997 | Lin et al. |
| 5,661,592 A | 8/1997 | Bornstein et al. |
| 5,665,997 A | 9/1997 | Weaver et al. |
| 5,673,139 A | 9/1997 | Johnson |
| 5,677,785 A | 10/1997 | Koo et al. |
| 5,683,591 A | 11/1997 | Offenberg |
| 5,699,074 A | 12/1997 | Sutherland et al. |
| 5,699,181 A | 12/1997 | Choi |
| 5,703,710 A | 12/1997 | Brinkman et al. |
| 5,710,656 A | 1/1998 | Goossen |
| 5,719,068 A | 2/1998 | Suzawa et al. |
| 5,726,480 A | 3/1998 | Pister |
| 5,734,177 A | 3/1998 | Sakamoto |
| 5,739,945 A | 4/1998 | Tayebati |
| 5,740,150 A | 4/1998 | Uchimaru et al. |
| 5,745,193 A | 4/1998 | Urbanus et al. |
| 5,745,281 A | 4/1998 | Yi et al. |
| 5,751,469 A | 5/1998 | Arney et al. |
| 5,771,116 A | 6/1998 | Miller et al. |
| 5,784,190 A | 7/1998 | Worley |
| 5,784,212 A | 7/1998 | Hornbeck |
| 5,786,927 A | 7/1998 | Greywall |
| 5,793,504 A | 8/1998 | Stoll |
| 5,808,780 A | 9/1998 | McDonald |
| 5,808,781 A | 9/1998 | Arney et al. |
| 5,818,095 A | 10/1998 | Sampsell |
| 5,825,528 A | 10/1998 | Goossen |
| 5,835,255 A | 11/1998 | Miles |
| 5,838,484 A | 11/1998 | Goossen et al. |
| 5,842,088 A | 11/1998 | Thompson |
| 5,867,302 A | 2/1999 | Fleming |
| 5,870,221 A | 2/1999 | Goossen |
| 5,905,482 A | 5/1999 | Hughes et al. |
| 5,912,758 A | 6/1999 | Knipe et al. |
| 5,914,804 A | 6/1999 | Goossen |
| 5,920,417 A | 7/1999 | Johnson |
| 5,920,418 A | 7/1999 | Shiono et al. |
| 5,920,471 A | 7/1999 | Rajagopalan et al. |
| 5,943,158 A | 8/1999 | Ford et al. |
| 5,959,763 A | 9/1999 | Bozler et al. |
| 5,961,848 A | 10/1999 | Jacquet et al. |
| 5,963,788 A | 10/1999 | Barron et al. |
| 5,986,796 A | 11/1999 | Miles |
| 5,994,174 A | 11/1999 | Carey et al. |
| 6,028,689 A | 2/2000 | Michalicek et al. |
| 6,028,690 A | 2/2000 | Carter et al. |
| 6,031,653 A | 2/2000 | Wang |
| 6,038,056 A | 3/2000 | Florence et al. |
| 6,040,937 A | 3/2000 | Miles |
| 6,046,659 A | 4/2000 | Loo et al. |
| 6,046,840 A | 4/2000 | Huibers |
| 6,049,317 A | 4/2000 | Thompson et al. |
| 6,055,090 A | 4/2000 | Miles |
| 6,056,406 A | 5/2000 | Park |
| 6,061,075 A | 5/2000 | Nelson et al. |
| 6,097,145 A | 8/2000 | Kastalsky et al. |
| 6,099,132 A | 8/2000 | Kaeriyama |
| 6,100,861 A | 8/2000 | Cohen et al. |
| 6,100,872 A | 8/2000 | Aratani et al. |
| 6,113,239 A | 9/2000 | Sampsell et al. |
| 6,115,014 A | 9/2000 | Aoki et al. |
| 6,124,851 A | 9/2000 | Jacobson |
| 6,142,358 A | 11/2000 | Cohn et al. |
| 6,147,680 A | 11/2000 | Tareev |
| 6,147,790 A | 11/2000 | Meier et al. |
| 6,158,156 A | 12/2000 | Patrick |
| 6,160,833 A | 12/2000 | Floyd et al. |
| 6,171,945 B1 | 1/2001 | Mandal et al. |
| 6,172,797 B1 | 1/2001 | Huibers |
| 6,180,428 B1 | 1/2001 | Peeters et al. |
| 6,195,196 B1 | 2/2001 | Kimura et al. |
| 6,201,633 B1 | 3/2001 | Peeters et al. |
| 6,215,221 B1 | 4/2001 | Cabuz et al. |
| 6,232,936 B1 | 5/2001 | Gove et al. |
| 6,239,777 B1 | 5/2001 | Sugahara et al. |
| 6,242,932 B1 | 6/2001 | Hembree |
| 6,243,149 B1 | 6/2001 | Swanson et al. |
| 6,262,697 B1 | 7/2001 | Stephenson |
| 6,282,010 B1 | 8/2001 | Sulzbach et al. |
| 6,288,472 B1 | 9/2001 | Cabuz et al. |
| 6,288,824 B1 | 9/2001 | Kastalsky |
| 6,295,154 B1 | 9/2001 | Laor et al. |
| 6,297,811 B1 | 10/2001 | Kent et al. |
| 6,301,000 B1 | 10/2001 | Johnson |
| 6,316,289 B1 | 11/2001 | Chung |
| 6,323,982 B1 | 11/2001 | Hornbeck |
| 6,323,987 B1 | 11/2001 | Rinaudo et al. |
| 6,327,071 B1 | 12/2001 | Kimura |
| 6,331,909 B1 | 12/2001 | Dunfield |
| 6,335,235 B1 | 1/2002 | Bhakta et al. |
| 6,335,831 B2 | 1/2002 | Kowarz et al. |
| 6,342,970 B1 | 1/2002 | Sperger et al. |
| 6,351,329 B1 | 2/2002 | Greywall |
| 6,356,254 B1 | 3/2002 | Kimura |
| 6,356,378 B1 | 3/2002 | Huibers |
| 6,358,021 B1 | 3/2002 | Cabuz |
| 6,376,787 B1 | 4/2002 | Martin et al. |
| 6,377,233 B2 | 4/2002 | Colgan et al. |
| 6,381,022 B1 | 4/2002 | Zavracky |
| 6,384,952 B1 | 5/2002 | Clark et al. |
| 6,392,618 B1 | 5/2002 | Kimura |

(56) References Cited

U.S. PATENT DOCUMENTS

| | | |
|---|---|---|
| 6,400,738 B1 | 6/2002 | Tucker et al. |
| 6,407,851 B1 | 6/2002 | Islam et al. |
| 6,417,868 B1 | 7/2002 | Bock et al. |
| 6,433,917 B1 | 8/2002 | Mei et al. |
| 6,437,583 B1 | 8/2002 | Tartagni et al. |
| 6,438,282 B1 | 8/2002 | Takeda et al. |
| 6,447,126 B1 | 9/2002 | Hornbeck |
| 6,449,084 B1 | 9/2002 | Guo |
| 6,452,712 B2 | 9/2002 | Atobe et al. |
| 6,456,420 B1 | 9/2002 | Goodwin-Johansson |
| 6,465,355 B1 | 10/2002 | Horsley |
| 6,466,190 B1 | 10/2002 | Evoy |
| 6,466,354 B1 | 10/2002 | Gudeman |
| 6,466,358 B2 | 10/2002 | Tew |
| 6,473,072 B1 | 10/2002 | Comiskey et al. |
| 6,473,274 B1 | 10/2002 | Maimone et al. |
| 6,480,177 B2 | 11/2002 | Doherty et al. |
| 6,496,122 B2 | 12/2002 | Sampsell |
| 6,519,073 B1 | 2/2003 | Goossen |
| 6,525,867 B1 | 2/2003 | Oakley et al. |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,556,338 B2 | 4/2003 | Han et al. |
| 6,574,033 B1 | 6/2003 | Chui et al. |
| 6,589,625 B1 | 7/2003 | Kothari et al. |
| 6,597,490 B2 | 7/2003 | Tayebati |
| 6,600,201 B2 | 7/2003 | Hartwell et al. |
| 6,606,175 B1 | 8/2003 | Sampsell et al. |
| 6,608,268 B1 | 8/2003 | Goldsmith |
| 6,624,944 B1 | 9/2003 | Wallace et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,635,919 B1 | 10/2003 | Melendez et al. |
| 6,642,913 B1 | 11/2003 | Kimura et al. |
| 6,643,069 B2 | 11/2003 | Dewald |
| 6,650,455 B2 | 11/2003 | Miles |
| 6,657,386 B2 | 12/2003 | Koshio et al. |
| 6,657,832 B2 | 12/2003 | Williams et al. |
| 6,660,656 B2 | 12/2003 | Cheung et al. |
| 6,661,561 B2 | 12/2003 | Fitzpatrick et al. |
| 6,666,561 B1 | 12/2003 | Blakley |
| 6,674,033 B1 | 1/2004 | Wang |
| 6,674,090 B1 | 1/2004 | Chua et al. |
| 6,674,562 B1 | 1/2004 | Miles et al. |
| 6,674,563 B2 | 1/2004 | Chui et al. |
| 6,680,792 B2 | 1/2004 | Miles |
| 6,698,295 B1 | 3/2004 | Sherrer |
| 6,707,594 B2 | 3/2004 | Holmes |
| 6,710,908 B2 | 3/2004 | Miles et al. |
| 6,738,194 B1 | 5/2004 | Ramirez et al. |
| 6,741,383 B2 | 5/2004 | Huibers et al. |
| 6,741,384 B1 | 5/2004 | Martin et al. |
| 6,741,503 B1 | 5/2004 | Farris et al. |
| 6,744,335 B2 | 6/2004 | Ryhanen et al. |
| 6,747,785 B2 | 6/2004 | Chen et al. |
| 6,747,800 B1 | 6/2004 | Lin |
| 6,753,937 B2 | 6/2004 | Grupp |
| 6,768,555 B2 | 7/2004 | Chen et al. |
| 6,775,174 B2 | 8/2004 | Huffman et al. |
| 6,778,034 B2 | 8/2004 | Nir et al. |
| 6,778,155 B2 | 8/2004 | Doherty et al. |
| 6,784,956 B2 | 8/2004 | Matsumoto et al. |
| 6,794,119 B2 | 9/2004 | Miles |
| 6,809,788 B2 | 10/2004 | Yamada et al. |
| 6,811,267 B1 | 11/2004 | Allen et al. |
| 6,813,059 B2 | 11/2004 | Hunter et al. |
| 6,813,060 B1 | 11/2004 | Garcia et al. |
| 6,819,469 B1 | 11/2004 | Koba |
| 6,822,628 B2 | 11/2004 | Dunphy et al. |
| 6,829,132 B2 | 12/2004 | Martin et al. |
| 6,836,366 B1 | 12/2004 | Flanders et al. |
| 6,841,081 B2 | 1/2005 | Chang et al. |
| 6,844,959 B2 | 1/2005 | Huibers et al. |
| 6,849,471 B2 | 2/2005 | Patel et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'souza et al. |
| 6,862,127 B1 | 3/2005 | Ishii |
| 6,864,882 B2 | 3/2005 | Newton |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,882,461 B1 | 4/2005 | Tsai et al. |
| 6,885,409 B2 | 4/2005 | Stephenson et al. |
| 6,891,588 B2 | 5/2005 | Kawachi et al. |
| 6,891,658 B2 | 5/2005 | Whitehead et al. |
| 6,912,022 B2 | 6/2005 | Lin et al. |
| 6,913,942 B2 | 7/2005 | Patel et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,959,990 B2 | 11/2005 | Penn |
| 6,960,305 B2 | 11/2005 | Doan et al. |
| 6,980,350 B2 | 12/2005 | Hung et al. |
| 6,982,820 B2 | 1/2006 | Tsai |
| 6,983,135 B1 | 1/2006 | Tsai et al. |
| 6,999,225 B2 | 2/2006 | Lin et al. |
| 7,002,726 B2 | 2/2006 | Patel et al. |
| 7,006,272 B2 | 2/2006 | Tsai |
| 7,008,812 B1 | 3/2006 | Carley |
| 7,009,754 B2 | 3/2006 | Huibers |
| 7,027,204 B2 | 4/2006 | Trisnadi et al. |
| 7,034,981 B2 | 4/2006 | Makigaki |
| 7,046,422 B2 | 5/2006 | Kimura et al. |
| 7,053,737 B2 | 5/2006 | Schwartz et al. |
| 7,072,093 B2 | 7/2006 | Piehl et al. |
| 7,075,700 B2 | 7/2006 | Muenter |
| 7,113,339 B2 | 9/2006 | Taguchi et al. |
| 7,119,945 B2 | 10/2006 | Kothari et al. |
| 7,123,216 B1 | 10/2006 | Miles |
| 7,126,738 B2 | 10/2006 | Miles |
| 7,126,741 B2 | 10/2006 | Wagner et al. |
| 7,135,643 B2 | 11/2006 | van Haaster et al. |
| 7,161,728 B2 | 1/2007 | Sampsell et al. |
| 7,184,202 B2 | 2/2007 | Miles et al. |
| 7,198,973 B2 | 4/2007 | Lin et al. |
| 7,205,722 B2 | 4/2007 | Koshio et al. |
| 7,221,495 B2 | 5/2007 | Miles et al. |
| 7,236,284 B2 | 6/2007 | Miles |
| 7,245,285 B2 | 7/2007 | Yeh et al. |
| 7,250,930 B2 | 7/2007 | Hoffman et al. |
| 7,265,809 B2 | 9/2007 | Dunn et al. |
| 7,277,143 B2 | 10/2007 | Funahata et al. |
| 7,289,259 B2 | 10/2007 | Chui et al. |
| 7,298,437 B2 | 11/2007 | Edwards et al. |
| 7,301,704 B2 | 11/2007 | Miles |
| 7,302,157 B2 | 11/2007 | Chui |
| 7,304,784 B2 | 12/2007 | Chui et al. |
| 7,310,121 B2 | 12/2007 | Hirakata et al. |
| 7,321,456 B2 | 1/2008 | Cummings |
| 7,321,457 B2 | 1/2008 | Heald |
| 7,324,176 B2 | 1/2008 | Dunn et al. |
| 7,327,510 B2 | 2/2008 | Cummings et al. |
| 7,370,185 B2 * | 5/2008 | Piehl et al. .................. 713/1 |
| 7,372,613 B2 | 5/2008 | Chui et al. |
| 7,372,619 B2 | 5/2008 | Miles |
| 7,385,762 B2 | 6/2008 | Cummings |
| 7,420,725 B2 | 9/2008 | Kothari |
| 7,439,943 B2 | 10/2008 | Nakanishi |
| 7,459,402 B2 | 12/2008 | Doan et al. |
| 7,460,291 B2 | 12/2008 | Sampsell et al. |
| 7,476,327 B2 | 1/2009 | Tung et al. |
| 7,492,503 B2 | 2/2009 | Chui |
| 7,508,566 B2 | 3/2009 | Feenstra et al. |
| 7,532,377 B2 | 5/2009 | Miles |
| 7,532,381 B2 | 5/2009 | Miles et al. |

(56) References Cited

U.S. PATENT DOCUMENTS

| | | |
|---|---|---|
| 7,535,621 B2 | 5/2009 | Chiang |
| 7,542,198 B2 | 6/2009 | Kothari |
| 7,550,794 B2 | 6/2009 | Miles et al. |
| 7,554,711 B2 | 6/2009 | Miles |
| 7,564,612 B2 | 7/2009 | Chui |
| 7,567,373 B2 | 7/2009 | Chui et al. |
| 7,612,932 B2 | 11/2009 | Chui et al. |
| 7,630,121 B2 | 12/2009 | Endisch et al. |
| 7,656,391 B2 | 2/2010 | Kimura et al. |
| 7,672,035 B2 | 3/2010 | Sampsell et al. |
| 7,684,106 B2 | 3/2010 | Sampsell |
| 7,692,844 B2 | 4/2010 | Miles |
| 7,704,772 B2 | 4/2010 | Tung et al. |
| 7,738,157 B2 | 6/2010 | Miles |
| 7,808,694 B2 | 10/2010 | Miles |
| 7,826,120 B2 | 11/2010 | Miles |
| 7,830,586 B2 | 11/2010 | Miles |
| 7,830,587 B2 | 11/2010 | Miles |
| 7,830,588 B2 | 11/2010 | Miles |
| 7,839,557 B2 | 11/2010 | Chui et al. |
| 7,852,544 B2 | 12/2010 | Sampsell |
| 7,852,545 B2 | 12/2010 | Miles |
| 7,872,792 B2 | 1/2011 | Miles |
| 7,889,415 B2 | 2/2011 | Kothari |
| 7,893,919 B2 | 2/2011 | Kothari et al. |
| 7,898,722 B2 | 3/2011 | Miles |
| 7,944,599 B2 | 5/2011 | Chui et al. |
| 7,948,671 B2 | 5/2011 | Tung et al. |
| 7,982,700 B2 | 7/2011 | Chui et al. |
| 8,008,736 B2 | 8/2011 | Kothari |
| 8,035,883 B2 | 10/2011 | Kothari |
| 8,035,884 B2 | 10/2011 | Miles |
| 8,059,326 B2 | 11/2011 | Miles |
| 8,243,360 B2 | 8/2012 | Kothari |
| 8,390,547 B2 | 3/2013 | Chui et al. |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0014579 A1 | 2/2002 | Dunfield |
| 2002/0021485 A1 | 2/2002 | Pilossof |
| 2002/0027636 A1 | 3/2002 | Yamada |
| 2002/0054424 A1 | 5/2002 | Miles |
| 2002/0070931 A1 | 6/2002 | Ishikawa |
| 2002/0075555 A1 | 6/2002 | Miles |
| 2002/0114558 A1 | 8/2002 | Nemirovsky |
| 2002/0126364 A1 | 9/2002 | Miles |
| 2002/0139981 A1 | 10/2002 | Young |
| 2002/0146200 A1 | 10/2002 | Kurdle et al. |
| 2002/0149828 A1 | 10/2002 | Miles |
| 2002/0149834 A1 | 10/2002 | Mei et al. |
| 2002/0149850 A1 | 10/2002 | Heffner et al. |
| 2002/0154422 A1 | 10/2002 | Sniegowski et al. |
| 2002/0167072 A1 | 11/2002 | Andosca |
| 2002/0167730 A1 | 11/2002 | Needham et al. |
| 2002/0186483 A1 | 12/2002 | Hagelin et al. |
| 2002/0197761 A1 | 12/2002 | Patel et al. |
| 2003/0011864 A1 | 1/2003 | Flanders |
| 2003/0015936 A1 | 1/2003 | Yoon et al. |
| 2003/0016428 A1 | 1/2003 | Kato et al. |
| 2003/0029705 A1 | 2/2003 | Qiu et al. |
| 2003/0035196 A1 | 2/2003 | Walker |
| 2003/0043157 A1 | 3/2003 | Miles |
| 2003/0053078 A1 | 3/2003 | Missey et al. |
| 2003/0054924 A1 | 3/2003 | Amore |
| 2003/0119221 A1 | 6/2003 | Cunningham et al. |
| 2003/0123125 A1 | 7/2003 | Little |
| 2003/0138669 A1 | 7/2003 | Kojima et al. |
| 2003/0156315 A1 | 8/2003 | Li et al. |
| 2003/0173504 A1 | 9/2003 | Cole et al. |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0210851 A1 | 11/2003 | Fu et al. |
| 2004/0008396 A1 | 1/2004 | Stappaerts |
| 2004/0008438 A1 | 1/2004 | Sato |
| 2004/0027636 A1 | 2/2004 | Miles |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0056742 A1 | 3/2004 | Dabbaj |
| 2004/0066477 A1 | 4/2004 | Morimoto et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0124483 A1 | 7/2004 | Partridge et al. |
| 2004/0125281 A1 | 7/2004 | Lin et al. |
| 2004/0125347 A1 | 7/2004 | Patel et al. |
| 2004/0136045 A1 | 7/2004 | Tran |
| 2004/0140557 A1 | 7/2004 | Sun et al. |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0148009 A1 | 7/2004 | Buzzard et al. |
| 2004/0150939 A1 | 8/2004 | Huff |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0179445 A1 | 9/2004 | Park et al. |
| 2004/0184134 A1 | 9/2004 | Makigaki |
| 2004/0184766 A1 | 9/2004 | Kim et al. |
| 2004/0188599 A1 | 9/2004 | Viktorovitch et al. |
| 2004/0201908 A1 | 10/2004 | Kaneko |
| 2004/0207897 A1 | 10/2004 | Lin |
| 2004/0209195 A1 | 10/2004 | Lin |
| 2004/0212026 A1 | 10/2004 | Van Brocklin et al. |
| 2004/0217264 A1 | 11/2004 | Wood et al. |
| 2004/0217378 A1 | 11/2004 | Martin et al. |
| 2004/0217919 A1 | 11/2004 | Pichi et al. |
| 2004/0218251 A1 | 11/2004 | Piehl et al. |
| 2004/0218334 A1 | 11/2004 | Martin et al. |
| 2004/0227493 A1 | 11/2004 | Van Brocklin et al. |
| 2004/0233503 A1 | 11/2004 | Kimura |
| 2004/0240138 A1 | 12/2004 | Martin et al. |
| 2004/0245588 A1 | 12/2004 | Nikkel et al. |
| 2004/0259010 A1 | 12/2004 | Kanbe |
| 2005/0001797 A1 | 1/2005 | Miller et al. |
| 2005/0001828 A1 | 1/2005 | Martin et al. |
| 2005/0002082 A1 | 1/2005 | Miles |
| 2005/0003667 A1 | 1/2005 | Lin et al. |
| 2005/0014374 A1 | 1/2005 | Partridge et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0038950 A1 | 2/2005 | Adelmann |
| 2005/0042117 A1 | 2/2005 | Lin |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068627 A1 | 3/2005 | Nakamura et al. |
| 2005/0069209 A1 | 3/2005 | Damera-Venkata et al. |
| 2005/0078348 A1 | 4/2005 | Lin |
| 2005/0117190 A1 | 6/2005 | Iwauchi et al. |
| 2005/0117623 A1 | 6/2005 | Shchukin et al. |
| 2005/0122306 A1 | 6/2005 | Wilcox et al. |
| 2005/0128543 A1 | 6/2005 | Phillips et al. |
| 2005/0133761 A1 | 6/2005 | Thielemans |
| 2005/0168849 A1 | 8/2005 | Lin |
| 2005/0179378 A1 | 8/2005 | Oooka et al. |
| 2005/0195462 A1 | 9/2005 | Lin |
| 2005/0239275 A1 | 10/2005 | Muthukumar et al. |
| 2005/0275930 A1 | 12/2005 | Patel et al. |
| 2006/0007517 A1 | 1/2006 | Tsai |
| 2006/0017379 A1 | 1/2006 | Su et al. |
| 2006/0017689 A1 | 1/2006 | Faase et al. |
| 2006/0022966 A1 | 2/2006 | Mar |
| 2006/0038643 A1 | 2/2006 | Xu et al. |
| 2006/0044654 A1 | 3/2006 | Vandorpe et al. |

(56) References Cited

U.S. PATENT DOCUMENTS

| | | |
|---|---|---|
| 2006/0066936 A1 | 3/2006 | Chui et al. |
| 2006/0067633 A1 | 3/2006 | Gally et al. |
| 2006/0082863 A1 | 4/2006 | Piehl et al. |
| 2006/0220160 A1 | 10/2006 | Miles |
| 2007/0020948 A1 | 1/2007 | Piehl et al. |
| 2007/0153860 A1 | 7/2007 | Chang-Hasnain et al. |
| 2008/0088910 A1 | 4/2008 | Miles |
| 2008/0297880 A1 | 12/2008 | Steckl et al. |
| 2009/0174651 A1 | 7/2009 | Jacobson et al. |
| 2011/0019380 A1 | 1/2011 | Miles |
| 2011/0026096 A1 | 2/2011 | Miles |
| 2011/0080632 A1 | 4/2011 | Miles |
| 2011/0170166 A1 | 7/2011 | Miles |
| 2011/0170167 A1 | 7/2011 | Miles |
| 2011/0188110 A1 | 8/2011 | Miles |

FOREIGN PATENT DOCUMENTS

| | | |
|---|---|---|
| EP | 0 035 299 | 9/1983 |
| EP | 0310176 A2 | 4/1989 |
| EP | 0361981 A2 | 4/1990 |
| EP | 0 668 490 | 8/1995 |
| EP | 0667548 A1 | 8/1995 |
| EP | 0 695 959 | 2/1996 |
| EP | 0788005 A2 | 8/1997 |
| EP | 0 879 991 | 11/1998 |
| EP | 0 969 306 | 1/2000 |
| EP | 0 986 077 | 3/2000 |
| EP | 1 122 577 | 8/2001 |
| EP | 1126256 A2 | 8/2001 |
| EP | 1170618 A2 | 1/2002 |
| EP | 1 205 782 | 5/2002 |
| EP | 1 227 346 | 7/2002 |
| EP | 1 275 997 | 1/2003 |
| EP | 1 403 212 | 3/2004 |
| EP | 1435336 A2 | 7/2004 |
| EP | 1439515 A2 | 7/2004 |
| EP | 1 473 581 | 11/2004 |
| EP | 1473691 A2 | 11/2004 |
| EP | 1484635 A1 | 12/2004 |
| EP | 1 928 028 | 6/2008 |
| FR | 2824643 A1 | 11/2002 |
| JP | 56-088111 | 7/1981 |
| JP | 62082454 | 4/1987 |
| JP | 03-180890 | 8/1991 |
| JP | 04-309925 | 2/1992 |
| JP | 04-276721 | 10/1992 |
| JP | 5-49238 | 2/1993 |
| JP | 5-281479 | 10/1993 |
| JP | 5275401 A | 10/1993 |
| JP | H06138638 A | 5/1994 |
| JP | H06222290 A | 8/1994 |
| JP | H06289438 A | 10/1994 |
| JP | H07270613 A | 10/1995 |
| JP | 08-051230 | 2/1996 |
| JP | 08-292382 | 11/1996 |
| JP | 9127439 | 5/1997 |
| JP | H10500224 A | 1/1998 |
| JP | H10186249 A | 7/1998 |
| JP | H112764 A | 1/1999 |
| JP | 11-211999 | 8/1999 |
| JP | 2000500245 A | 1/2000 |
| JP | 2000 147262 | 5/2000 |
| JP | 2000214804 A | 8/2000 |
| JP | 2000306515 A | 11/2000 |
| JP | 2001-221913 | 8/2001 |
| JP | 2001 249283 | 9/2001 |
| JP | 2002-062490 | 2/2002 |
| JP | 2002040238 A | 2/2002 |
| JP | 2002040339 A | 2/2002 |
| JP | 2002062493 A | 2/2002 |
| JP | 2002174721 A | 6/2002 |
| JP | 2002-221678 | 8/2002 |
| JP | 2002277771 A | 9/2002 |
| JP | 2003-340795 | 2/2003 |
| JP | 2003 177336 | 6/2003 |
| JP | 2003195201 A | 7/2003 |
| JP | 2004-012642 | 1/2004 |
| JP | 2004157527 A | 6/2004 |
| JP | 2004-212638 | 7/2004 |
| JP | 2004-212680 | 7/2004 |
| JP | 2004235465 | 8/2004 |
| JP | 2004286825 A | 10/2004 |
| JP | 2005-234515 | 9/2005 |
| JP | 2005 279831 | 10/2005 |
| JP | 2005-308871 | 11/2005 |
| JP | 2007 027150 | 2/2007 |
| TW | 157313 | 5/1991 |
| WO | WO 95/03562 | 2/1995 |
| WO | WO 98/14804 | 4/1998 |
| WO | WO 98/43129 | 10/1998 |
| WO | WO 98/59382 | 12/1998 |
| WO | WO 01/53113 | 7/2001 |
| WO | WO 02/24570 | 3/2002 |
| WO | 02079853 A1 | 10/2002 |
| WO | WO 02/086582 | 10/2002 |
| WO | 03014789 A2 | 2/2003 |
| WO | 03054925 A2 | 7/2003 |
| WO | 03069404 A1 | 8/2003 |
| WO | 03085728 A1 | 10/2003 |
| WO | WO 03/105198 | 12/2003 |
| WO | WO 2004/006003 | 1/2004 |
| WO | 2004042687 A2 | 5/2004 |
| WO | 2005006364 A1 | 1/2005 |
| WO | 2005010566 A2 | 2/2005 |

OTHER PUBLICATIONS

Brosnihan et al., Jun. 2003, Optical IMEMS—a fabrication process for MEMS optical switches with integrated on-chip electronic, Transducers, Solid-State Sensors, Actuators and Microsystems, 12th International Conference 2003, 2(8-12):1638-1642.

Cacharelis et al., 1997, A Reflective-mode PDLC Light Valve Display Technology, Proceedings of European Solid State Device Research Conference (ESSDERC), pp. 596-599.

Conner, Hybrid Color Display Using Optical Interference Filter Array, SID Digest, pp. 577-580 (1993).

Fork, et al., Chip on Glass Bonding Using StressedMetalTM Technology, SID 05 Digest, pp. 534-537, 2005.

Hohlfeld et al., Jun. 2003, Micro-machined tunable optical filters with optimized band-pass spectrum, 12th International Conference on Transducers, Solid-State Sensors, Actuators and Microsystems, 2:1494-1497.

Jerman et al., A Miniature Fabry-Perot Interferometer with a Corrugated Silicon Diaphragm Support, (1988).

Jerman et al., Miniature Fabry-Perot Interferometers Micromachined in Silicon for Use in Optical Fiber WDM Systems, Transducers, San Francisco, Jun. 24-27, 1991, Proceedings on the Int'l. Conf. on Solid State Sensors and Actuators, Jun. 24, 1991, pp. 372-375.

Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.

Longhurst, 1963, Chapter IX: Multiple Beam Interferometry, in Geometrical and Physical Optics, pp. 153-157.

Maier et al., 1996, 1.3" active matrix liquid crystal spatial light modulator with 508 dpi resolution, SPIE vol. 2754, pp. 171-179.

Mehregany et al., 1996, MEMS applications in optical systems, IEEE/LEOS 1996 Summer Topical Meetings, pp. 75-76.

Miles et al, Oct. 21, 1997, A MEMS based interferometric modulator (IMOD) for display applications, Proceedings of Sensors Expo, pp. 281-284.

Miles, A New Reflective FPD Technology Using Interferometric Modulation, Journal of the SID, 5/4, 1997.

Miles, Interferometric modulation: MOEMS as an enabling technology for high performance reflective displays, Proceedings of SPIE, 4985:131-139, 2003.

Nakagawa et al., Feb. 1, 2002, Wide-field-of-view narrow-band spectral filters based on photonic crystal nanocavities, Optics Letters, 27(3):191-193.

(56) References Cited

OTHER PUBLICATIONS

Nieminen et al., 2004, Design of a temperature-stable RF MEM capacitor, IEEE Journal of Microelectromechanical Systems, 13(5):705-714.
Pape et al., Characteristics of the deformable mirror device for optical information processing, Optical Engineering, 22(6):676-681, Nov.-Dec. 1983.
Tolansky, 1948, Chapter II: Multiple-Beam Interference, in Multiple-bean Interferometry of Surfaces and Films, Oxford at the Clarendon Press, pp. 8-11.
Wang, Jun. 29-Jul. 1, 2002, Design and fabrication of a novel two-dimension MEMS-based tunable capacitor, IEEE 2002 International Conference on Communications, Circuits and Systems and West Sino Expositions, 2:1766-1769.
Office Action dated May 3, 2007 for U.S. Appl. No. 11/119,432.
Office Action dated Jul. 7, 2008 in U.S. Appl. No. 11/925,692.
Notice of Reasons for Rejection dated Oct. 21, 2008 in Japanese App. No. 2005-267944.
Notice of Reasons for Rejection dated Mar. 10, 2009 in Japanese App. No. 2005-267944.
Notice of Reasons for Rejection dated Jun. 30, 2009 in Japanese App. No. 2005-267944.
Office Action received Sep. 23, 2008 in Chinese App. No. 200510105053.0.
Extended European Search Report dated Apr. 1, 2009 in App. No. 05255663.6.
Extended European Search Report dated May 14, 2012 in App. No. 11191183.0.
Official Action dated Aug. 5, 2009 in Russian App. No. 2005129945.
Notice to Submit a Response dated Dec. 26, 2011 in Korean App. No. 10-2005-0089755.
Akasaka Y., "Three-Dimensional IC Trends," Proceedings of IEEE, 1986, vol. 74 (12), pp. 1703-1714.
Aratani K, et al., "Process and Design Considerations for Surface Micromachined Beams for a Tuneable Interferometer Array in Silicon," Proc. IEEE Microelectromechanical workshop fort Lauderdale FL, 1993, 230-235.
Aratani K. et al., "Surface Micromachined Tuneable Interferometer Array," Sensors and Actuators A, Elsevier Sequoia S.A., Lausanne, CH, A, 1993, 43(1/3), 17-23.
Austrian Search Report for Ex144/2005 dated Aug. 11, 2005.
Austrian Search Report No. 140/2005, dated Jul. 15, 2005.
Austrian Search Report No. 150/2005, dated Jul. 29, 2005.
Austrian Search Report No. 161/2005, dated Jul. 15, 2005.
Austrian Search Report No. 162/2005, dated Jul. 14, 2005.
Austrian Search Report No. 164/2005, dated Jul. 4, 2005.
Austrian Search Report No. 66/2005 Dated May 9 2005.
Bass, "Fundamentals Techniques and Design Second Edition," Handbook of Optics, 1995, vol. 1, 2.29-2.36.
Butler, et al., "An Embedded Overlay Concept for Microsystems Packaging," IEEE Transactions on Advanced Packaging IEEE, 2000, vol. 23(4), 617-622.
Chiou, et al., "A Novel Capacitance Control Design of Tunable Capacitor using Multiple Electrostatic Driving Electrodes," IEEE Nanoelectronics and Giga-Scale Systems, 2001, 319-324.
Fan, et al., "Channel Drop Filters in Photonic Crystals," Optics Express, 1998, vol. 3(1), pp. 4-11.
Giles, et al., "A Silicon Mems Optical Switch Attenuator And its Use In Lightwave Subsystems," IEEE Journal of Selected Topics in Quantum Electronics, 1999, 5 (1), 18-25.
Goossen, et al., "Silicon Modulator Based on Mechnically-Active Anti-Reflection Layer With 1 Mbit/Sec Capability For Fiber-In-The-Loop Applications," IEEE Photonics Technology Letters, 1994, 1119-1121.
Goossen K.W. et al., "Possible Display Applications Of The Silicon Mechanical Antireflection Switch," Society for Information Display, 1994.
Goossen K.W., "MEMS-Based Variable Optical Interference Devices," IEEE/Lens International Conference on Optical Mems, Conference Digest, Piscataway, NJ, USA, IEEE Aug. 21, 2000, pp. 17-18.
Gosch, "West Germany Grabs the Lead in X-Ray Lithography," Electronics, 1987, 78-80.
Howard, et al., "Nanometer-Scale Fabrication Techniques," VLSI Electronics: Microstructure Science, 1982, vol. 5, 145-153, 166-173.
Ibbotson, et al., "Comparison of XeF.sub.2 and F-atom Reactions with Si and SiO.sub.2," Applied Physics Letters, 1984, 44(12), 1129-1131.
Jackson, "Classical Electrodynamics," John Wiley & Sons Inc, 1962, pp. 568-573.
Joannopoulos, et al., "Photonic Crystals Molding the Flow of Light," Princeton University Press, 1995.
Johnson, "Optical Scanners," Microwave Scanning Antennas, 1964, vol. 1(2), 251-261.
Kim, et al., "Control of Optical Transmission Through Metals Perforated With Subwave-Length Hole Arrays," Optic Letters, 1999, vol. 24(4), 256-258.
Light Over Matter Circle No. 36, Jun. 1993.
Lin, et al., "Free-Space Micromachined Optical Switches for Optical NetWorking," IEEE Journal of Selected Topics in Quantum Electronics, 1999, vol. 5(1), 4-9.
Little, et al., "Vertically Coupled Microring Resonator Channel Dropping Filter," IEEE Photonics Technology Letters, 1999, 11(2), 215-217.
Londergan, et al., "Advanced processes for MEMS-based displays," Proceedings of the Asia Display, 2007, SID, 1, 107-112.
Magel G.A., "Integrated Optic Devices using Micromachined Metal Membranes," SPIE, 1996, vol. 2686, 54-63.
Nagami, et al., "Plastic Cell Architecture: Towards Reconfigurable Computing For General-Purpose, 0-8186-8900," IEEE, 1998, 68-77.
Newsbreaks, "Quantum-trench devices might operated at terahertz frequencies", Laser Focus World, May 1993.
Oliner, "Radiating Elements and Mutual Coupling," Microwave Scanning Antennas, 1966, vol. 2, 131-157 and pp. 190-194.
Peerlings et al., "Long Resonator Micromachined Tunable GaAs-AlAs Fabry-Perot Filter," IEEE Photonics Technology Letters, IEEE Service Center, 1997, vol. 9(9), 1235-1237.
Raley, et al., "A Fabry-Perot Microinterferometer for Visible Wavelengths," IEEE Solid-State Sensor and Actuator Workshop, 1992, 170-173.
Schnakenberg, et al., "TMAHW Etchants for Silicon Micromachining," International Conference on Solid State Sensors and Actuators-Digest of Technical Papers, 1991, 815-818.
Science and Technology, The Economist, pp. 89-90, (May 1999).
Sperger, et al., "High Performance Patterned All-Dielectric Interference Colour Filter for Display Applications," SID Digest, 1994, 81-83.
Stone J.M., "Radiation and Optics, An Introduction to the Classic Theory," 1963, McGraw-Hill, pp. 340-343.
Taiwan Search Report—TW094130885—TIPO—May 14, 2013.
Walker, et al., "Electron-Beam-Tunable Interference Filter Spatial Light Modulator," Optics Letters, 1988, vol. 13(5), 345-347.
Wang, et al., "Flexible Circuit-Based RF MEMS Switches," Proceedings of 2001 ASME International Mechanical Engineering Congress and Exposition, Nov. 11-16, 2001 pp. 757-762.
Williams, et al., "Etch Rates for Micromachining Processing," Journal of Microelectromechanical Systems, 1996, vol. 5(4), 256-269.
Winters, et al., "The Etching of Silicon with XeF2 Vapor," Applied Physics Letters, 1979, vol. 34(1), 70-73.
Winton et al., "A novel way to capture solar energy," Chemical Week, pp. 17-18 (May 15, 1985).
Wu, et al., "Design of a Reflective Color LCD using Optical Interference Reflectors," Asia Display, Changchun Institute of Physics, 1995, 929-931.
Wu, et al., "MEMS Designed for Tunable Capacitors," Microwave Symposium Digest, IEEE MTT-S Int'l., 1998, vol. 1, 127-129.
Zhou et al., "Waveguide Panel Display Using Electromechanism Spatial Modulators," SID Digest, 1998, vol. XXIX.

* cited by examiner

DEVICE HAVING A CONDUCTIVE LIGHT ABSORBING MASK AND METHOD FOR FABRICATING SAME

CROSS REFERENCE TO RELATED APPLICATIONS

This application is a continuation of U.S. application Ser. No. 13/251,009, filed Sep. 30, 2011, now U.S. Pat. No. 8,243,360, which is a continuation of U.S. application Ser. No. 13/010,665, filed Jan. 20, 2011, now U.S. Pat. No. 8,035,883, which is a continuation of U.S. application Ser. No. 12/426,168, filed Apr. 17, 2009, now U.S. Pat. No. 7,889,415, which is a continuation of U.S. application Ser. No. 11/925,692, filed Oct. 26, 2007, now U.S. Pat. No. 7,542,198, which is a divisional of U.S. application Ser. No. 11/119,432, filed Apr. 29, 2005, now U.S. Pat. No. 7,420,725. U.S. application Ser. No. 11/119,432 claims the benefit of U.S. Provisional No. 60/613,480, titled "Device Having A Conductive Light Absorbing Mask and Method for Fabricating Same," filed Sep. 27, 2004. The disclosures of all the above-referenced prior applications, publications, and patents are considered part of the disclosure of this application, and are incorporated by reference herein in their entirety. This application is related to U.S. Pat. No. 6,741,377 entitled "Device Having a Light-Absorbing Mask and a Method for Fabricating Same," filed Jul. 2, 2002, which is assigned to the assignee of the present invention.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

A first embodiment includes an optical device including a substrate, an optical element disposed on the substrate, the optical element having an optical characteristic which changes in response to a voltage applied to the optical element, and a light-absorbing, electrically-conductive optical mask disposed on the substrate and at a location that is at least partially different than that of the optical element, the optical mask electrically coupled to the optical element to provide one or more electrical paths for application of voltages to the optical element. In one aspect of this embodiment, the optical element comprises an interferometric modulator. In a second aspect of this embodiment, the optical mask is configured to appear black. In a third aspect of this embodiment, the optical mask is configured to appear a color other than black. In a fourth aspect of this embodiment, the device further includes a column electrode electrically coupled to the mask to form an electrically parallel connection. In a fifth aspect of this embodiment, the device further includes a row electrode electrically coupled to the mask to form an electrically parallel connection. In a sixth aspect of this embodiment, the mask comprises a film stack. In a seventh aspect of this embodiment, the mask is electrically coupled to the optical element by one or more conductive vias. In an eighth embodiment, the film stack comprises a first reflective layer and a second reflective layer, and the first reflective layer can be electrically connected to a first electrode and the second reflective layer can be electrically connected to a second electrode. In a ninth embodiment, the first reflective layer and the second reflective layer are electrically connected to the same electrode.

A second embodiment includes a method of providing an electrical signal to a plurality of optical elements of a display, the optical elements individually actuatable by applying a voltage thereto, the method includes electrically coupling an electrically-conductive, light-absorbing mask to one or more optical elements, and applying a voltage to the mask to activate the one or more optical elements. In one aspect of this embodiment, the optical elements comprise interferometric modulators. In a second aspect of this embodiment, the mask comprises a film stack. In a third aspect of this embodiment the mask comprises one or more interferometric modulators. In a fourth aspect of this embodiment, one or more of the interferometric modulators included in the mask are static interferometric modulators. In a fifth aspect of this embodiment, the mask comprises a film stack.

A third embodiment includes a method of fabricating an optical device, the method including forming an electrically-conductive optical mask on a substrate, wherein the optical mask absorbs light, forming an optical component on the substrate in a location that is at least partially different than that of the optical mask, wherein the optical component has a driven state and an undriven state, the optical component changing between the driven state and the undriven state in response to an applied voltage, each state having a characteristic optical response to incident light, and electrically connecting the optical mask to the optical component so at least a portion of the optical mask provides a bus for applying the voltage to the optical component. In one aspect of this embodiment, the optical component comprises an interferometric modulator. In a second aspect of this embodiment, the optical mask comprises one or more interferometric modulators. In a third aspect of this embodiment, one or more interferometric modulators are static. In a fourth aspect of this embodiment, the optical mask comprises a film stack. In a fifth aspect of this embodiment, the film stack comprises a non-light-absorbing dielectric material sandwiched between two light-reflecting materials. In a sixth aspect of this embodiment, one or more of the light-reflecting materials comprises silver, aluminum, or chromium.

A fourth embodiment includes a method of fabricating an optical device comprising at least one active optical component formed on a transparent substrate, the method including identifying an area on the substrate that is to be light-absorbing wherein the identified area is laterally offset from the at least one active optical component, and fabricating a conductive light-absorbing mask on the identified area prior to fabricating the at least one active optical component, wherein the mask is connected to the active optical component. In one aspect of this embodiment, the optical component comprises a pixel, the light-absorbing area being an area bordering the pixel. In a second aspect of this embodiment, the fabricating further includes depositing a first light-reflecting layer on the substrate, depositing a non-light-absorbing dielectric layer on the first light-reflecting layer, and depositing a second light-reflecting layer on the non-light absorbing dielectric layer, wherein one or more of the first or second light-reflecting layer is electrically conductive. In a third aspect of this embodiment, the first and second light-reflecting layers comprise metallic materials. In a fourth aspect of this embodiment, the non-light absorbing dielectric layer comprises an oxide layer. In a fifth aspect of this embodiment, the pixel is defined by an interferometric modulator. In a sixth aspect of this embodiment, the light-absorbing mask comprises a static interferometric modulator.

A fifth embodiment includes an optical device including means for reflecting incident light from an optical component, wherein the optical component has a driven state and an undriven state, the optical component changing between the driven state and the undriven state in response to an applied voltage, each state having a characteristic optical response to incident light, means for absorbing light in an electrically-conductive optical mask disposed on the substrate and at a location that is at least partially different than that of the optical component, and means for electrically connecting the optical mask to the optical component so at least a portion of the optical mask provides an electrical bus for a voltage applied to the optical component.

A sixth embodiment includes an optical device produced by the process including identifying an area on the substrate that is to be light-absorbing wherein the identified area is laterally offset from the at least one active optical component, and fabricating a conductive light-absorbing mask on the identified area prior to fabricating the at least one active optical component, wherein the mask is connected to the active optical component.

DETAILED DESCRIPTION OF CERTAIN EMBODIMENTS

Figure 1:
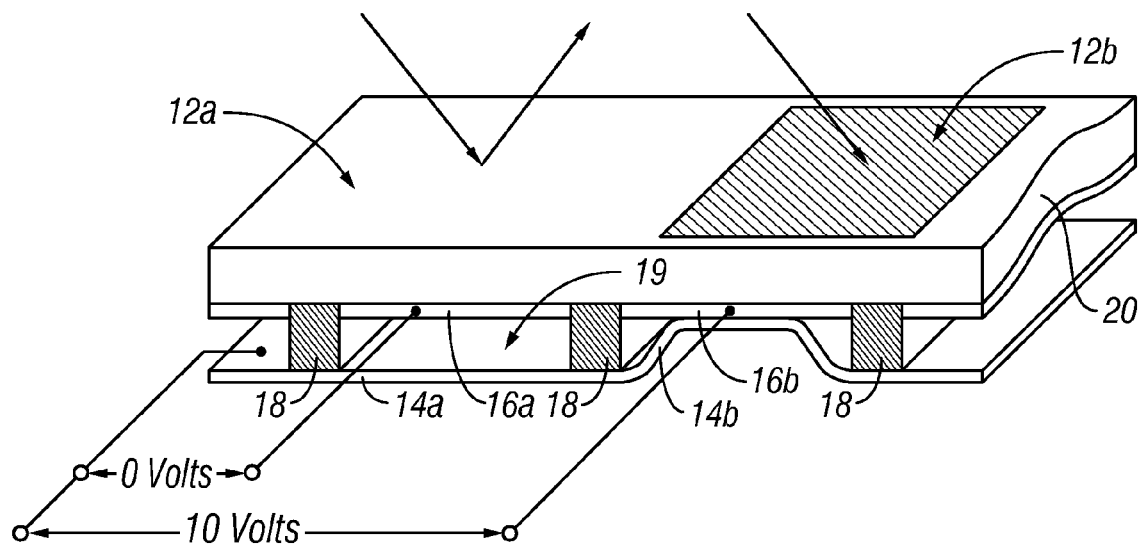
FIG. 1 is an isometric view depicting a portion of one embodiment of an interferometric modulator display in which a movable reflective layer of a first interferometric modulator is in a released position and a movable reflective layer of a second interferometric modulator is in an actuated position.

The following detailed description is directed to certain specific embodiments of the invention. In this description, reference is made to the drawings wherein like parts are designated with like numerals throughout.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The desire to view video data on high resolution mobile device displays while meeting power limitations is facilitated by minimizing the resistance of the display control lines. For these and other reasons, it is desirable to increase the conductance of the signal lines while minimizing the amount of additional passive or non-active optical contents in a display. The present invention discloses, in one embodiment, a multi-purpose optical component that acts as a conductive optical mask, e.g., a "black mask," to absorb ambient or stray light and to improve the optical response of a display device by increasing the contrast ratio, and to also function as an electrical bussing layer. In some applications, the conductive mask can reflect light of a predetermined wavelength to appear as a color other than black. The conductive mask, also referred to herein simply as a "mask," can be electrically coupled to one or more of the elements on the display to provide one or more electrical paths for voltages applied to one or more of the display elements. For example, depending on the configuration desired, one or more of the row or column electrodes can be connected to the conductive mask to reduce the resistance of the connected row or column electrode. In one embodiment, a MEMS display device, for example, an array of interferometric modulators, comprises a dynamic optical component (e.g., a dynamic interferometric modulator) and a static optical component (e.g., a static interferometric modulator) laterally offset from the dynamic optical component. The static optical component functions as the "black mask" to absorb ambient or stray light in non-active areas of a display to improve the optical response of the dynamic optical component, and acts as an electrical bus for either a row or a column electrode of the array of interferometric modulators. For example, non-active areas can include one or more areas of a MEMS display device other than the area corresponding to a movable reflective layer. A non-active area can also include an area of a display device that is not used to display an image or data rendered on the display device.

Although a MEMS device, which includes an interferometric modulator, will be used to illustrate one embodiment, it is to be understood that the invention covers other optical devices such as various imaging display and optoelectronic devices in general, which have non-active areas which are required to be light-absorbing, but which do not include interferometric modulators (e.g., LED and plasma displays). As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of supports 18 and an intervening sacrificial material deposited between the supports 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
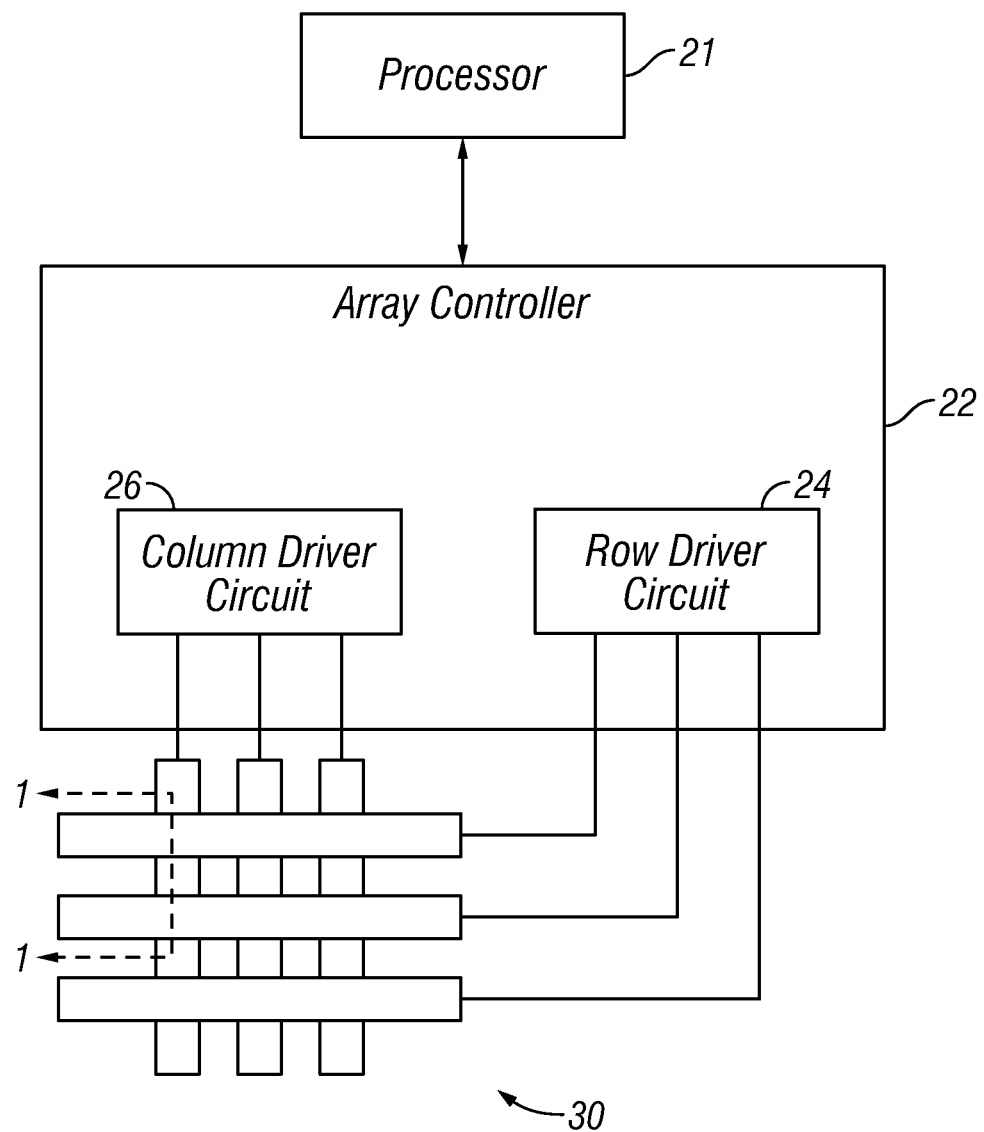
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
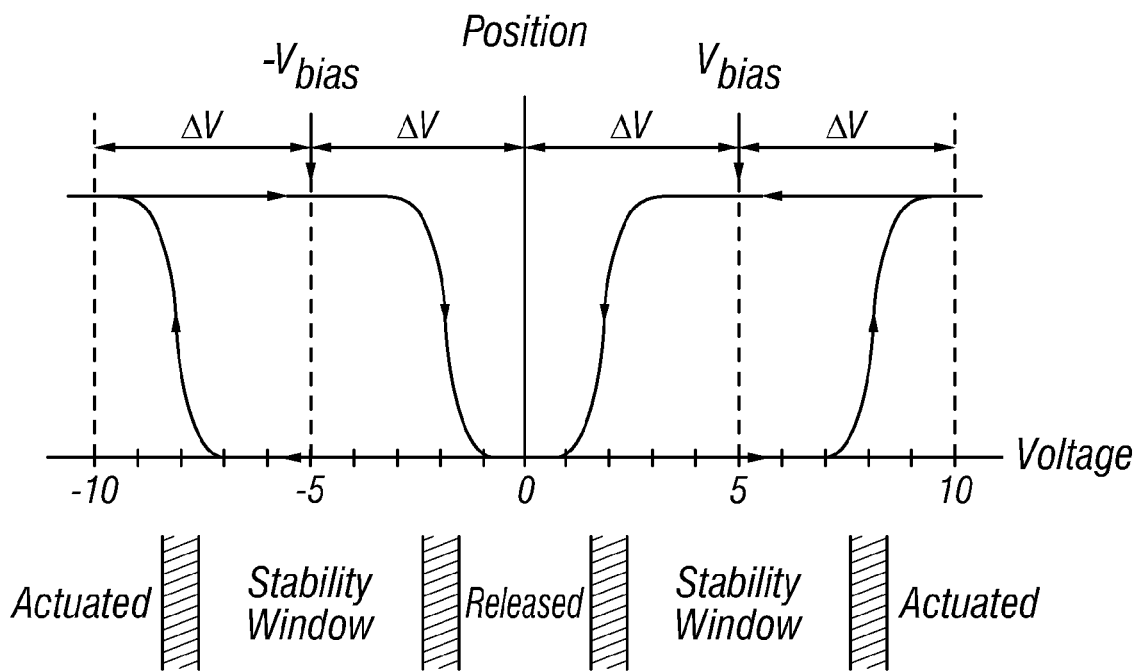
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively. Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
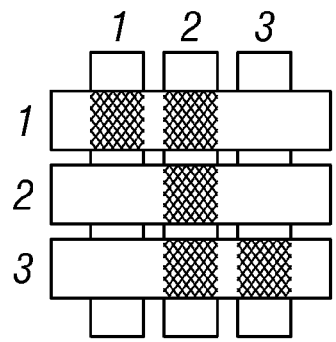
FIGS. 5A and 5B illustrate one exemplary timing diagram for row and column signals that may be used to write a frame of display data to the 3×3 interferometric modulator display of FIG. 2.
Figure 5B:
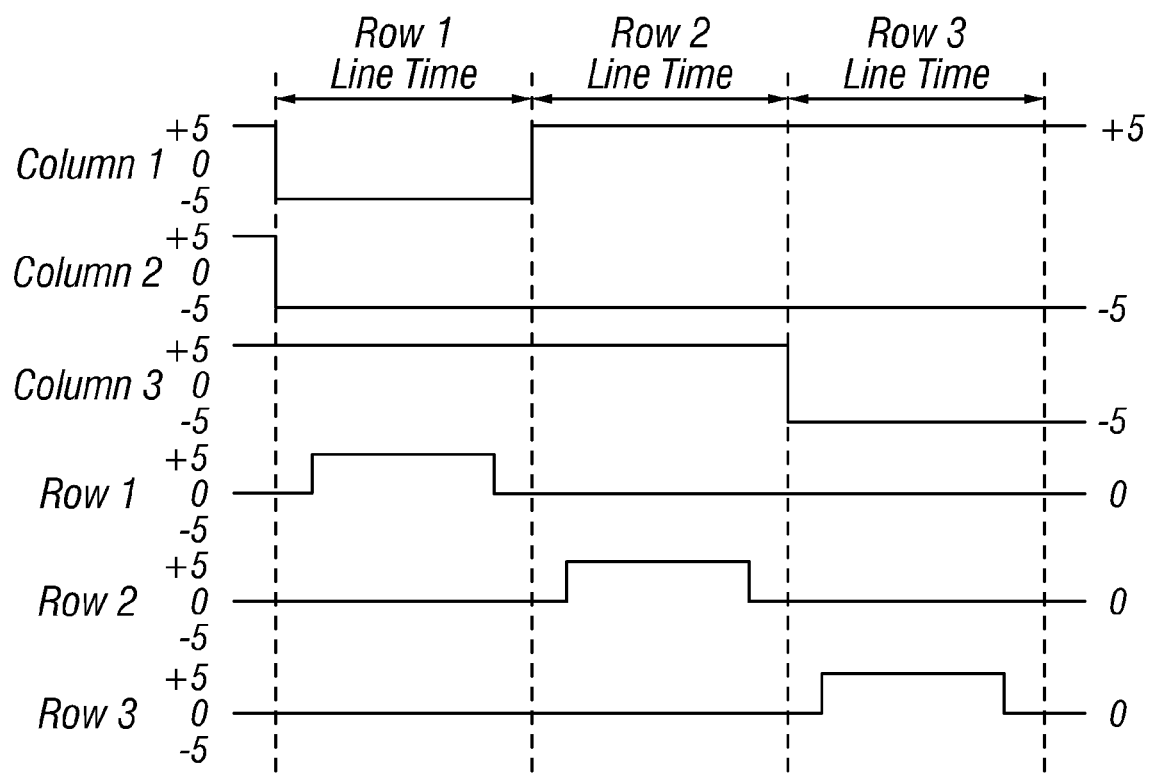

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
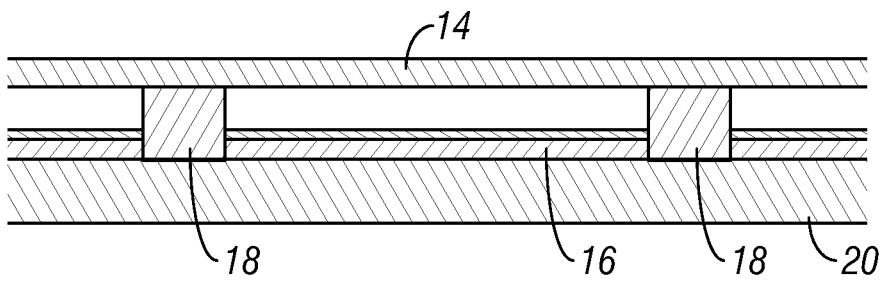
FIG. 6A is a cross section of the device of FIG. 1.
Figure 6B:
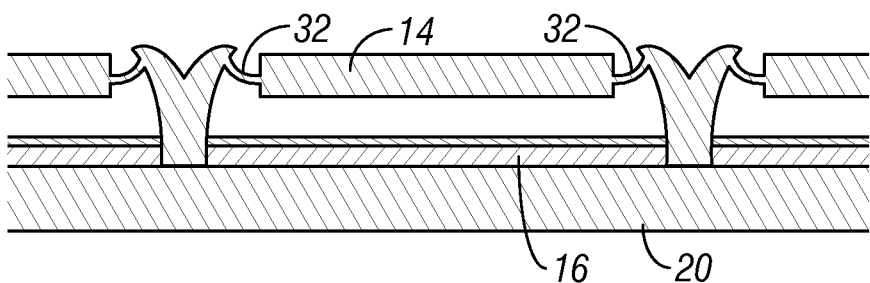
FIG. 6B is a cross section of an alternative embodiment of an interferometric modulator.
Figure 6C:
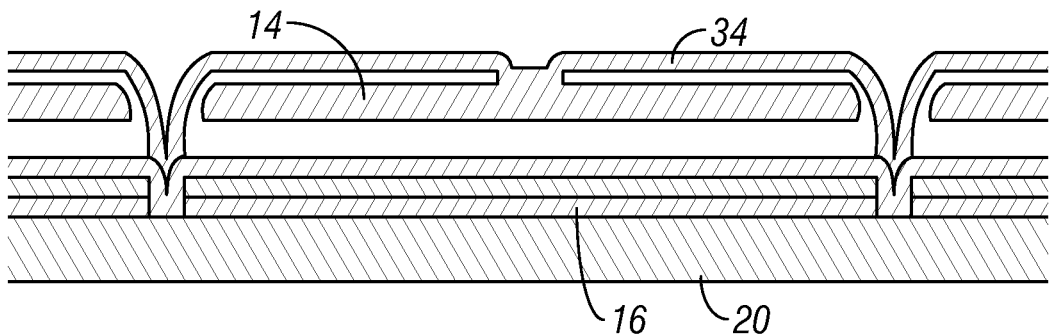
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7A:
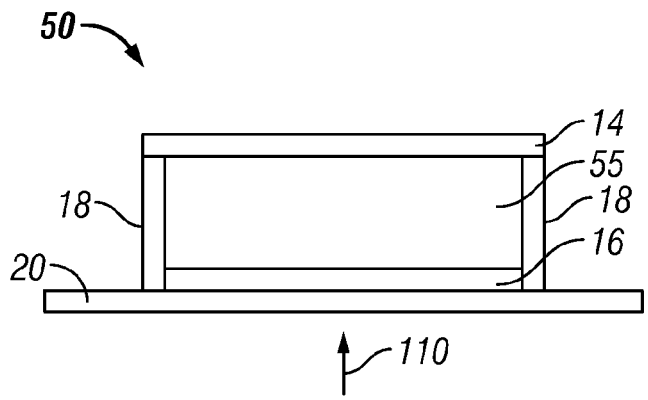
FIG. 7A is a cross-sectional side elevational view of a first exemplary interferometric modulator in a first state.

FIGS. 7A-7D illustrate certain aspects of the two interferometric modulator structures described above. FIG. 7A illustrates a simplified functional diagram of an interferometric modulator 50 in one exemplary embodiment. The interferometric modulator 50 comprises a substrate 20, an optical dielectric 16 upon the substrate 20, two supports 18 and a mirror 14 connected to the supports 18 so as to orient its face in a plane that is parallel to and laterally aligned with the plane of an upper face of the dielectric 16. The mirror 14 in FIG. 7A is shown in a mechanically relaxed first state so that it reflects incident light when the interferometric modulator is seen, e.g., from a viewing position 110. The distance between the optical dielectric 16 and the mirror 14 is tuned such that only light at a selected wavelength is reflected. The details of the method of selecting the geometries and materials are described in detail in the aforementioned U.S. Pat. No. 5,835,255 and the aforementioned U.S. patent application Ser. No. 09/966,843, now U.S. Pat. No. 6,867,896. In FIG. 7A, the supports 18, mirror 14, and optical dielectric 16 define an optical cavity 55.

Figure 7B:
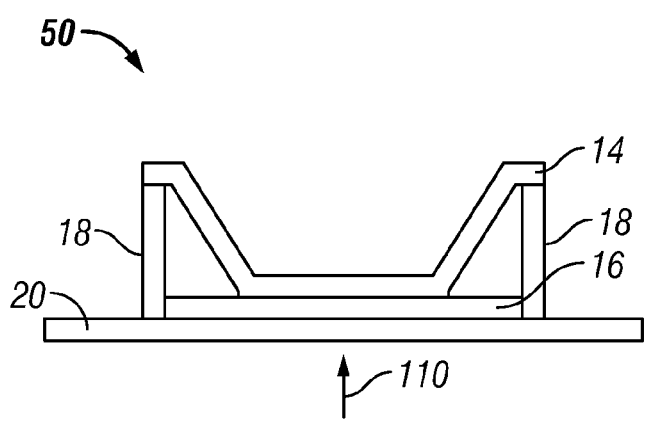
FIG. 7B is a cross-sectional side elevational view of the interferometric modulator of FIG. 7A in a second state.

FIG. 7B illustrates a simplified functional diagram of the interferometric modulator 50 shown in FIG. 6A where the mirror 14 is in a second state. In FIG. 7B, the mirror 14 is moved towards the optical dielectric layer 16 collapsing the optical cavity 55. The mirror 14 is moved by providing a voltage potential between electrodes coupled to the mirror 14 and the optical dielectric 16. By moving the mirror 14 to a second state that is in contact with or in close proximity to the optical dielectric 16, the optical properties of the interferometric modulator 50 in the second state are altered from in the first state. Light reflected from the interferometric modulator 50 in the second state (FIG. 7B) is a different color than light reflected from the interferometric modulator 50 in the first state. In one configuration, in the second state the interference of the light is such so that from the viewing position 110 the interferometric modulator appears black.

Figure 7C:
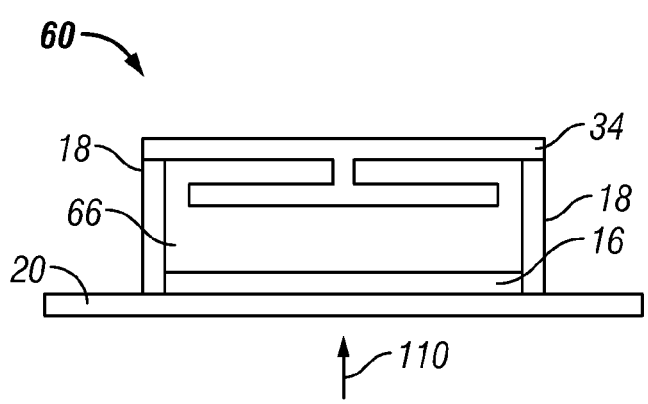
FIG. 7C is a cross-sectional side elevational view of second exemplary interferometric modulator in a first state.
Figure 7D:
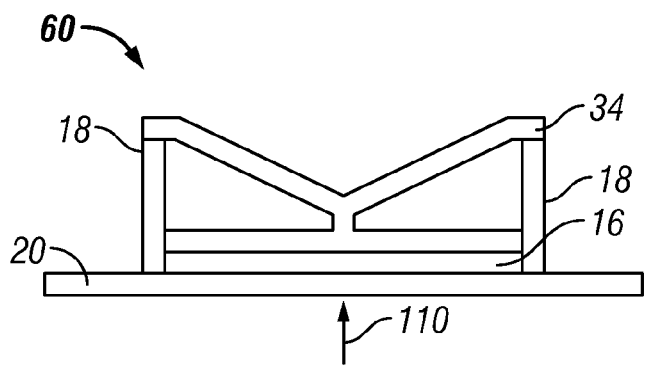
FIG. 7D is a cross-sectional side elevational view of the interferometric modulator of FIG. 7C in a second state.

FIGS. 7C and 7D illustrate another embodiment of an interferometric modulator 60 in a first "open" and a second "closed" state, respectively. This embodiment of the interferometric modulator 60 provides an increased usable mirror size as compared to the embodiment shown in FIGS. 7A and 7B. Referring back to FIG. 7B, there are areas of the mirror 14 which are not providing maximum reflectivity towards viewing position 110 because they are bending into the collapsed optical cavity 55. Comparing the mirror 34 in FIG. 7D to the mirror 14 in FIG. 7B, it can be seen that the mirror 34 in FIG. 7D occupies substantially the entire area corresponding to surface area of the optical dielectric 16 in the optical cavity 66. In the embodiment shown in FIG. 7D, the reflecting surface of the mirror 34 can be used for the reflection of light because it is not needed to bend the mirror into the collapsed optical cavity 66 when the interferometric modulator 60 is actuated. In FIGS. 7C and 7D, the substrate optical dielectric 16, two supports 18 and the substrate 20 remain unchanged from the interferometric modulator 50 shown in FIGS. 7A and 7B. Details of the structure and fabrication of this improved structure can be found in the aforementioned U.S. patent application Ser. No. 09/966,843.

Figure 8A:
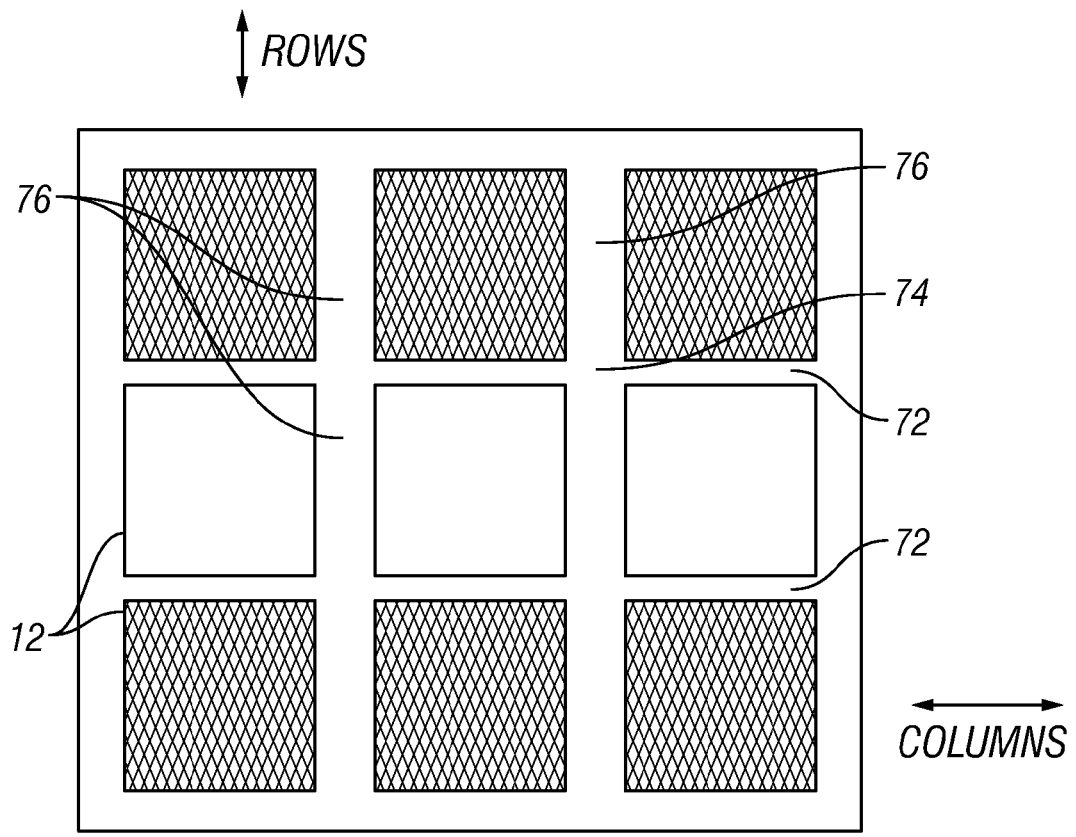
FIG. 8A is a top view of a portion of an interferometric modulator array illustrating non-active areas containing structures included in a plurality of pixels.
Figure 8B:
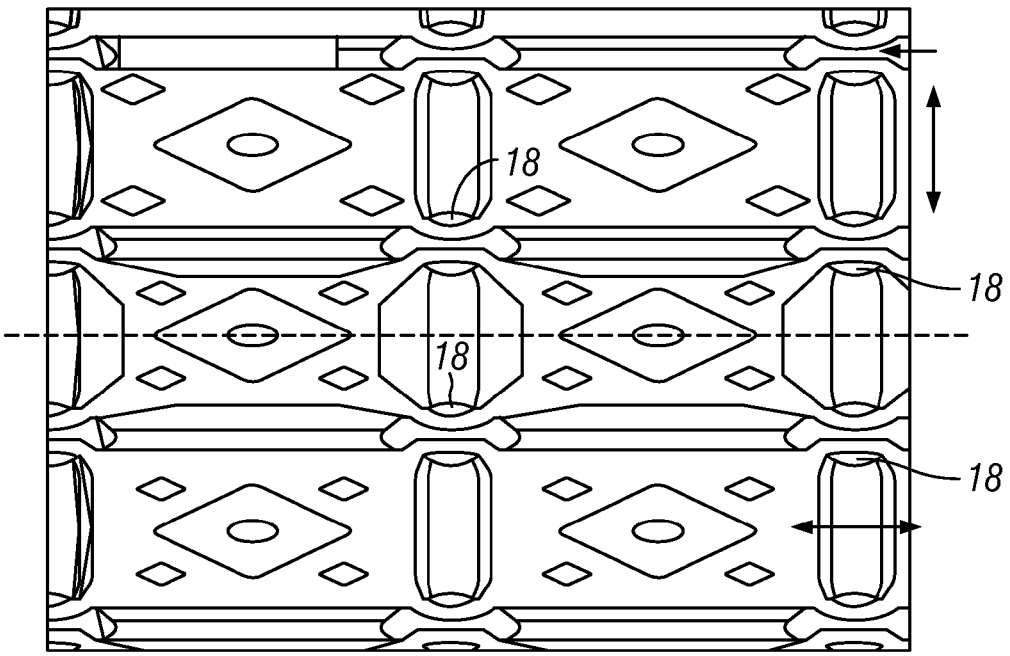
FIG. 8B is a top elevational view of a portion of an interferometric modulator array illustrating non-active areas containing structures included in a plurality of pixels.

FIGS. 8A and 8B illustrate an example of a portion of a display with display elements that can incorporate a conductive mask. FIGS. 8A and 8B illustrate an exemplary portion of a display that includes an array of interferometric modulators. A conductive mask can be used in the array shown in FIGS. 8A and 8B, and in any type of display where it is useful to mask off certain areas of the display from ambient light and form an electrically parallel connection of an electrical circuit in the display. FIG. 8A shows a plurality of pixels 12 of the array. FIG. 8B shows an example of supports 18 located on the plurality of pixels of the array of interferometric modulators that can be masked to improve the optical response of the display. To improve an optical response (e.g., contrast) of the display, it can be desirable to minimize light reflected from certain areas of the array. Any area of an interferometric modulator that increases the reflectance of the display in the dark state can be masked off (e.g., disposing a mask between the structure and light entering the interferometric modulator) using a black mask in order to increase the contrast ratio between an actuated pixel and an unactuated pixel. Some of the areas that can be masked to advantageously affect the display include, but are not limited to, row cuts between interferometric modulators 72 (FIG. 8A), the supports 18, bending areas of the movable mirror layers connecting to and/or around the supports 18, and areas between movable mirror layers of adjacent interferometric modulators 76 (FIG. 8A). The mask can be disposed in such areas so that it is spaced apart from the movable mirror of the interferometric modulators, e.g., so that ambient light can propagate to and reflect from the movable mirror but the areas other than the movable mirror are masked inhibiting ambient light from reflecting from any structures in the masked areas. These areas that are masked can be referred to as "non-active areas" because they are static, e.g., the areas do not include the movable mirror. In some embodiment, the mask can be conductive to minimize reflected light and provide one or more electrical paths that can be used for the optical element. In some embodiments, the mask can be disposed so that light entering the interferometric modulator falls onto either the masked area or the movable mirror. In other embodiments, at least a portion of the non-active areas are masked.

The rate at which display elements can respond to drive signals can depend on the resistance and capacitance of the control lines (e.g., row and column electrodes) carrying the drive signals to the display elements. The desire to view video on large displays and for high resolution displays demands that the resistance of the control lines be minimized. For these reasons, it is desirable to increase the conductance of the signal lines while minimizing the amount of additional passive optical contents in a display. One way to decrease the resistance is to provide one or more electrically parallel connections to the control lines. A dual-purpose mask can be provided that increases contrast ratio, and at the same time, acts as a bussing layer for the driving signals. For example, in one embodiment the conductive mask can be used to form an electrically parallel connection to one or more row or column electrodes of an array of display elements, for example, interferometric modulators. It will be appreciated that the electrically parallel connections can be designed in many ways, depending on the application and the type of display elements.

Figure 9:
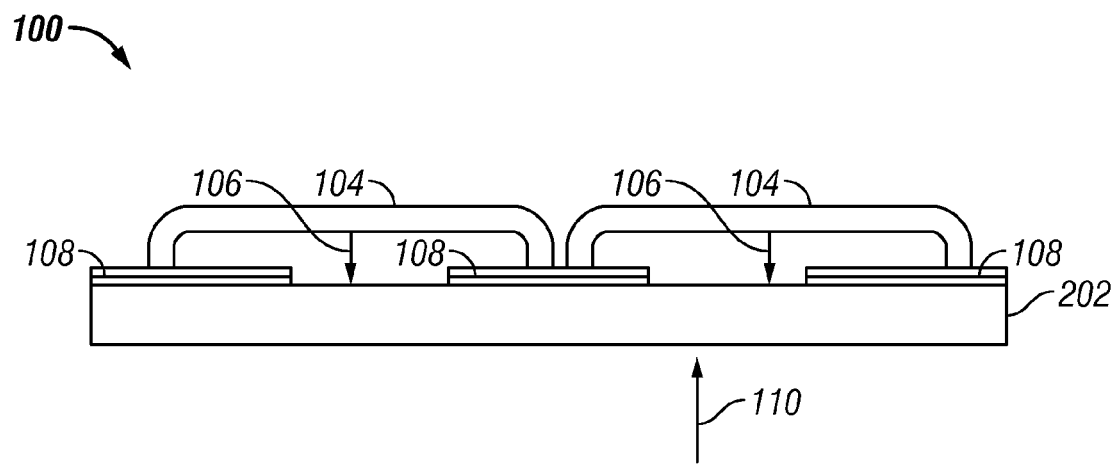
FIG. 9 shows a cross-section through a MEMS device having a mask or light-absorbing region in accordance with one embodiment of the invention.

FIG. 9 shows a cross-sectional view of a simplified representation of a display 100, according to one embodiment. The display comprises two optical components which are, in this embodiment, interferometric modulators 104. As described above, interferometric modulator devices 104 comprise an arrangement of reflective films that produce a desired optical response when the movable active area is driven towards a substrate 202 in a direction indicated by arrows 106. The general operation of the interferometric modulator devices 104 has been described in U.S. Pat. No. 5,835,255. In FIG. 9, reference numerals 108 indicate non-active areas of the interferometric modulators 104. Typically, it is desirable that the non-active areas 108 be light-absorbing or to function as a black mask so that when a viewer looks at the display 100 from a direction indicated by the viewing arrow 110, the optical response produced by the interferometric modulator devices 104 is not degraded by the reflection of ambient light from the non-active areas 108. In other embodiments, it can be desirable to mask the non-active areas 108 with a colored mask (for example, green, red, blue, yellow, etc.) other than black. To gain additional functionality from the mask, the mask can comprise one or more conductive materials which can be connected to circuitry in the display 100 and used in whole or in part to provide one or more electrical busses.

A mask for a non-active area 108 may be fabricated from materials selected to have an optical response which absorbs or attenuates light. One or more of the materials used to fabricate the mask are electrically conductive. According to embodiments of the invention, a mask for each non-active area 108 can be fabricated as a stack of thin films. For example, in one embodiment, the stack of thin films may comprise a non-light-absorbing dielectric layer sandwiched between two light reflecting chrome layers, as will be more fully described below. In other embodiments, the non-active areas 108 may comprise a single layer of organic or inorganic materials which attenuates or absorbs light, and a layer of a conductive material such as chrome or aluminum.

Figure 10:
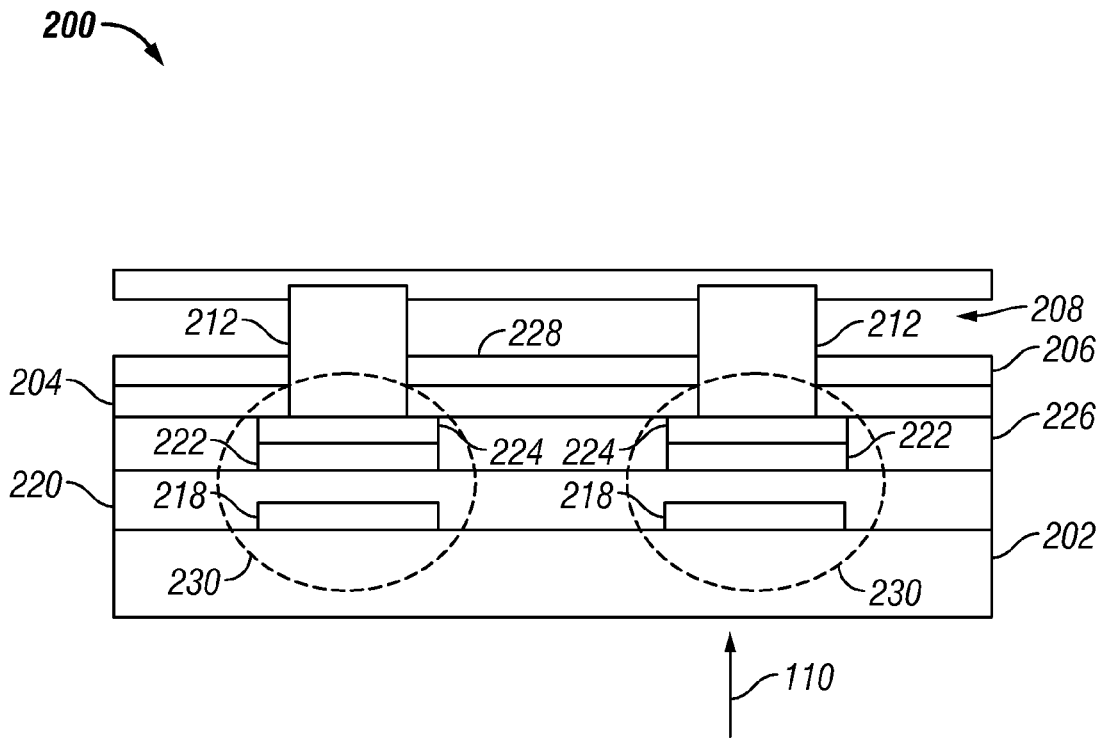
FIG. 10 shows a cross-section of another embodiment of a MEMS device having a mask or light-absorbing region in accordance with another embodiment of the invention.

FIG. 10 of the drawings shows a cross section through an interferometric modulator device 200 in accordance with one embodiment of the invention. The interferometric modulator device 200 includes an active component comprising an electrode reflective layer 204, an oxide layer 206, an air gap 208, and a mechanical membrane 210 disposed on a substrate 202. As used herein, the phrase "disposed on a substrate" is a broad phrase, and it indicates, for example that a referenced structure, layer, optical device, interferometric modulator, bi-stable device, electrode, film stack, support, electrode, mask or other referred to feature is located on a substrate, and can but does not necessarily require direct contact with the substrate, unless so indicated. The mechanical membrane 210 is supported in position by supports 212. In use, the mechanical membrane 210 is driven to contact the oxide layer 206 to produce a desired optical response when viewed from the direction indicated by arrow 110.

The supports 212, the areas of the interferometric modulator 200 on which the supports 212 are formed, and other areas that are not part of the active component of the interferometric modulator (for example, areas indicated by encircled areas 230) can be masked with a conductive mask to prevent or reduce the reflection of light from these areas which can otherwise interfere with the desired optical response of the active interferometric modulator components. The mask can be fabricated as a stack of films, including at least one electrically conducting film, selected so that the stack has the optical property of being light-absorbing and conductive, according to one embodiment. The mask can be formed on the substrate 202 prior to forming the active optical components of the interferometric modulators, according to one embodiment. The supports 212 of the interferometric modulator 200 can perform several functions. First, the supports 212 function as mechanical supports for the movable mechanical membrane 210. Second, the supports 212 can provide an electrical connection for the conductive mask, if the supports 212 comprise an electrically conductive material. For example, when a support 212 is connected to a conductive layer 222 the support 212 and the conductive layer 222 can provide one or more electrical paths to apply voltages to the movable mechanical membrane 210, as will be illustrated in following FIGS. 17-18, and 20-22.

As shown in FIG. 10 the interferometric modulator 200 includes a conductive mask that comprises a stack of thin films. In one embodiment, the mask comprises a first reflective chrome layer 218, an oxide middle layer 220 and a second reflective chrome layer 222. Other conductive materials can also be used to form the mask. For example, in another embodiment, the mask includes a stack of thin films comprising a chrome layer 218, an oxide middle layer 220 (for example, $SiO_2$), and an aluminum layer 222. The interferometric modulator 200 includes another oxide layer 226 between the oxide middle layer 220 and the electrode reflective layer 204. One or more electrically conductive layers of the mask can be connected other components of the interferometric modulator 200 to provide an electrical bus. For example, the mask can be connected to one or more column or row electrodes. In one embodiment, chrome layer 222 is connected to the electrode reflective layer 204 by vias 224 that comprise an electrically conductive material. The connections required in the configuration of the conductive mask so that it functions as an electrical bus can depend on the particular application. In some embodiments, the electrode reflective layer 204 includes electrical separators 228 (for example, gaps or non-conductive material) located in various positions to electrically separate conductive portions of the interferometric modulator, for example, the electrode reflective layer 204 or the supports 212, and suitably configure the mask to exhibit the desired bus functionality.

Figure 11:
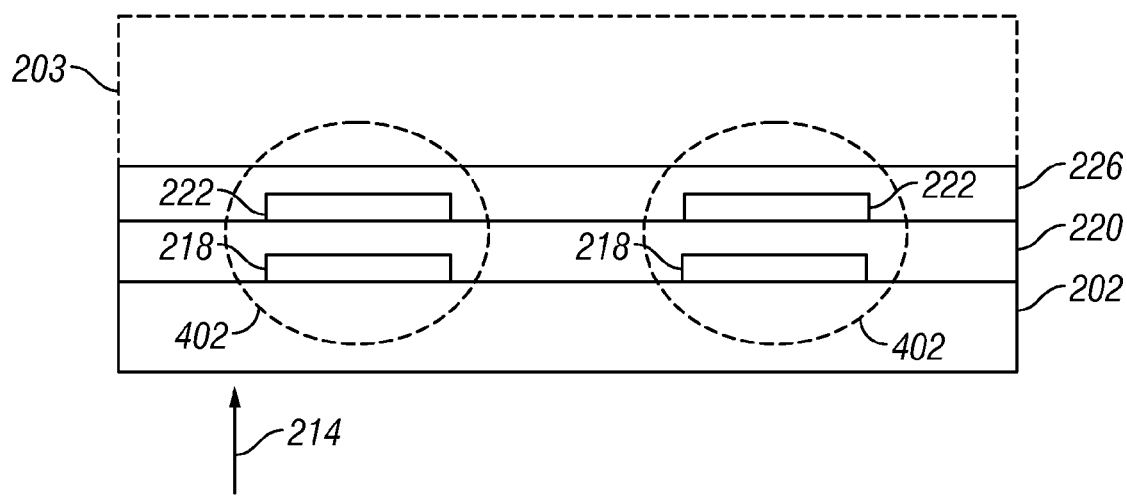
FIG. 11 is a cross-sectional view illustrating various layers that can be included in a MEMS device having a conductive mask.

One embodiment of fabricating a conductive mask is disclosed below in reference to FIGS. 11-17. FIG. 11 is a cross-sectional view illustrating various layers that can be included in a MEMS device, for example the MEMS device shown in FIG. 1, having a conductive mask 402. Only a portion of the MEMS device that includes the conductive mask 402 is shown in FIG. 11, the remaining portion of the MEMS device being indicated by the dashed rectangle 203. The conductive mask 402, indicated by the dashed circles, is illustrated as being fabricated on a substrate 202. The mask 402 comprises three layers of film, including a first reflective layer 218, an oxide layer 220 and a second reflective layer 222. The first reflective layer 218 and the second reflective layer 222 can comprise materials that are both reflective and conductive, for example, chrome, aluminum, or silver. For some embodiments, the conductive mask 402 can be structured as a static interferometric modulator that is configured so that it minimizes reflected light, e.g., appears black. In other embodiments, the conductive mask 402 can be structured as a static interferometric modulator that reflects light of a selected color. The films which make up the conductive mask 402 can be the same films which are used in the fabrication of the interferometric modulator components, thus making it possible to use the same deposition parameters to fabricate the mask and the interferometric modulator components. The conductive mask 402 can be used to provide greater flexibility in the routing of electrical signals around the display device and help minimize resistance of electrical circuits providing signals to the interferometric electrodes by providing electrically parallel connections for the signals.

The various stages in the manufacture of a conductive mask 402 and the MEMS device will now be described with reference to FIGS. 12-17.

Figure 12:
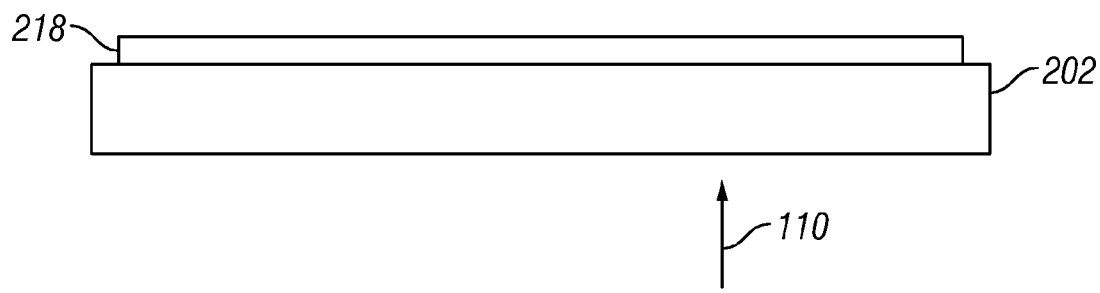
FIG. 12 is a cross-sectional view of a stage in the manufacture of a MEMS device having a conductive mask illustrating a reflective chrome layer deposited on a substrate.

FIG. 12 is a cross-sectional view of a stage in the manufacture of a MEMS device having a conductive mask illustrating a first reflective mask layer 218 deposited on a substrate 202. After an initial preparatory step wherein the substrate 202 is prepared, for example, cleaned, a first reflective mask layer 218 is deposited by sputter coating it onto substrate 202, according to one embodiment. In one exemplary embodiment, the thickness of first reflective mask layer 218 can be about 60 angstroms.

Figure 13:
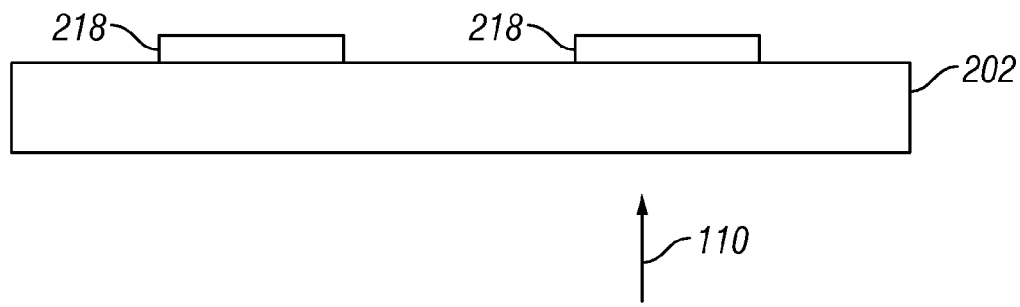
FIG. 13 is a cross-sectional view of a stage in the manufacture of a MEMS device having a conductive mask illustrating the reflective chrome layer of FIG. 12 with portions of the chrome layer removed.

FIG. 13 is a cross-sectional view of a stage in the manufacture of the MEMS device having a conductive mask illustrating the first reflective mask layer 218 of FIG. 12 with certain portions removed. For this fabrication, after the first reflective mask layer 218 is deposited, as shown in FIG. 12, the first reflective mask layer 218 is patterned and developed using conventional techniques to leave two or more portions or outcrops of chrome, which can serve as a base layer for a thin film stack which serves as a mask.

Figure 14:
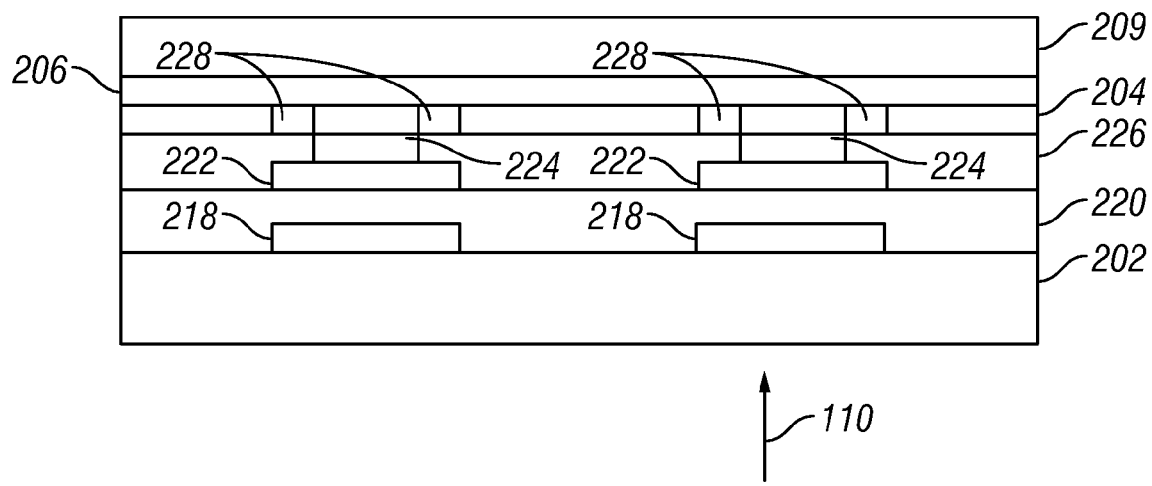
FIG. 14 is a cross-sectional view of a stage in the manufacture of a MEMS device having a conductive mask illustrating additional layers applied to the embodiment shown in FIG. 13.

FIG. 14 is a cross-sectional view of a stage in the manufacture of the MEMS device having a conductive mask illustrating additional layers that are fabricated on the embodiment shown in FIG. 13. As shown in FIG. 14, an oxide layer 220 is deposited on the substrate 202 covering the first reflective mask layer 218. In one embodiment the oxide layer 220 is about 300 to 800 angstroms in depth. This layer can be applied by sputter coating the $SiO_2$ onto the embodiment shown in FIG. 14. The thickness of the oxide layer 220 can depend on the quality of the color (e.g., black) state that is required for the mask, and it can also depend on the desired color of the mask.

Figure 16:
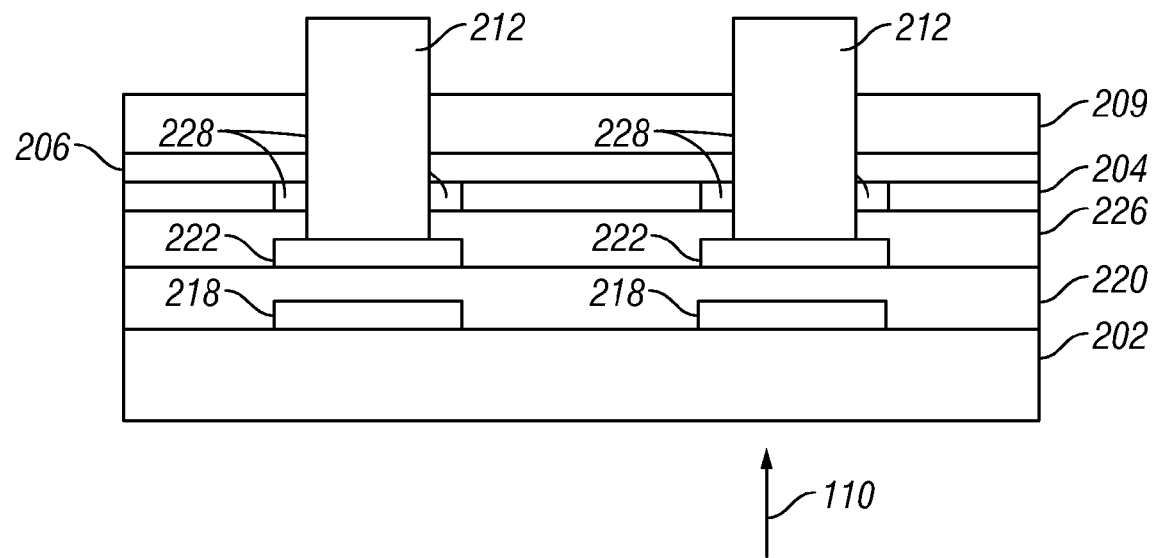
FIG. 16 is a cross-sectional view of a stage in the manufacture of a MEMS device having a conductive mask illustrating forming supports in the recesses shown in FIG. 15.

A second reflective layer 222 is deposited on the oxide layer 220, and the second reflective layer 222 is patterned and developed to form portions that correspond to the first reflective layer 218, forming a conductive mask comprising a thin film stack. Then an oxide layer 226 is deposited on the second reflective layer 222. Vias 224 can be formed in the oxide layer 226 so the second reflective layer 222 can be connected to a support 212, for example, as shown in FIG. 16. Electrical separators 228 can be formed in the electrode reflective layer 204, which is deposited on the oxide layer 226. The electrode reflective layer 204 is typically about 60 angstroms thick, its exact thickness being dependent on the required brightness of the ultimate display, a thinner layer yielding a brighter display. Based on the desired configuration and the utilization of the conductive mask, portions of the electrodes, for example, the electrode reflective layer 204, can be electrically separated by forming one or more separations 228 in the electrode reflective layer 204.

Thereafter, an oxide layer 206 and a sacrificial layer 209 are respectively sputter coated on to electrode reflective layer 204. The oxide layer 206 can comprise silicon oxide and can be about 300 to 800 angstroms thick, according to one embodiment. The sacrificial layer 209 can comprise comprising molybdenum and can be typically about 0.2 to 1.2 microns thick, according to one embodiment.

Figure 15:
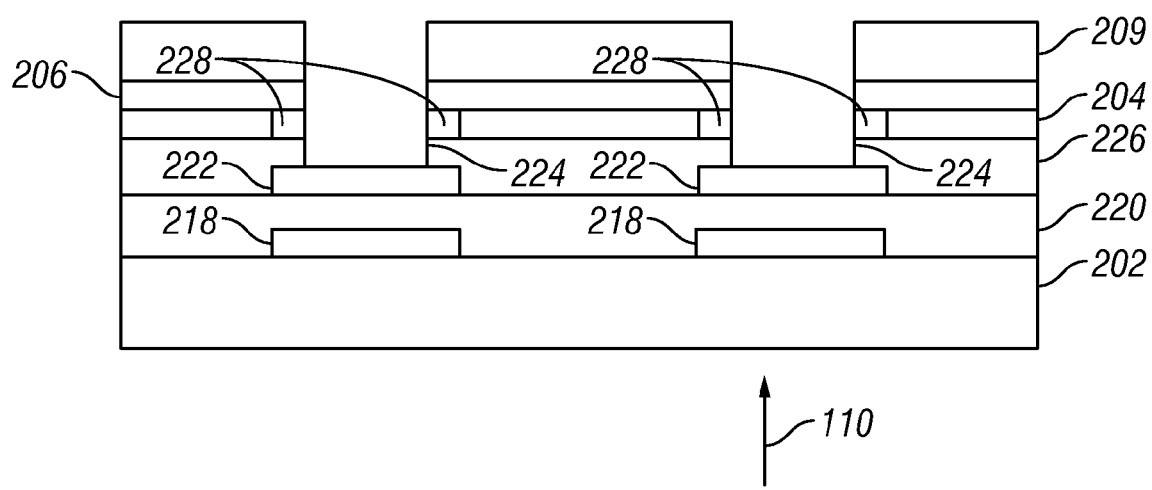
FIG. 15 is a cross-sectional view of a stage in the manufacture of a MEMS device having a conductive mask illustrating a patterning and etch step performed to form recesses for supports.

FIG. 15 is a cross-sectional view of a stage in the manufacture of a MEMS device having a conductive mask illustrating a patterning and etch step performed to form the recesses for supports. The patterning and an etching step is performed to form recesses which extend through the oxide layer 226 to the vias 224 and the second reflective layer 222, according to this embodiment. The vias 224 can be formed in the oxide layer 226 so the second reflective layer 222 can be connected to a support 212 (shown in FIG. 16). To form an electrical connection between the second reflective layer 222 of the conductive mask and another part of the MEMS device (e.g., the mechanical membrane 210 shown in FIG. 17) the support 212 can extend through the vias 224 to the second reflective layer 222, according to one embodiment. In another embodiment, the vias 224 are formed in the oxide layer 226 and are filled with an electrically conductive material which is connected to the support.

FIG. 16 is a cross-sectional view of a stage in the manufacture of a MEMS device having a conductive mask illustrating forming supports 212 in the recesses shown in FIG. 15. The supports 212 provide a structure that supports the movable mechanical membrane 210 (FIG. 17), and can be formed in the recesses by spinning a negative photoresist material over the thin film stack, exposing it through a suitable mask and developing it to form the supports 212. In this embodiment, electrical separators 228 isolate the supports 212 from the electrode reflective layer 204. Such separators 228 can be used to isolate the support 212 from the electrode reflective layer 204 when the support 212 comprises a conductive material.

Figure 17:
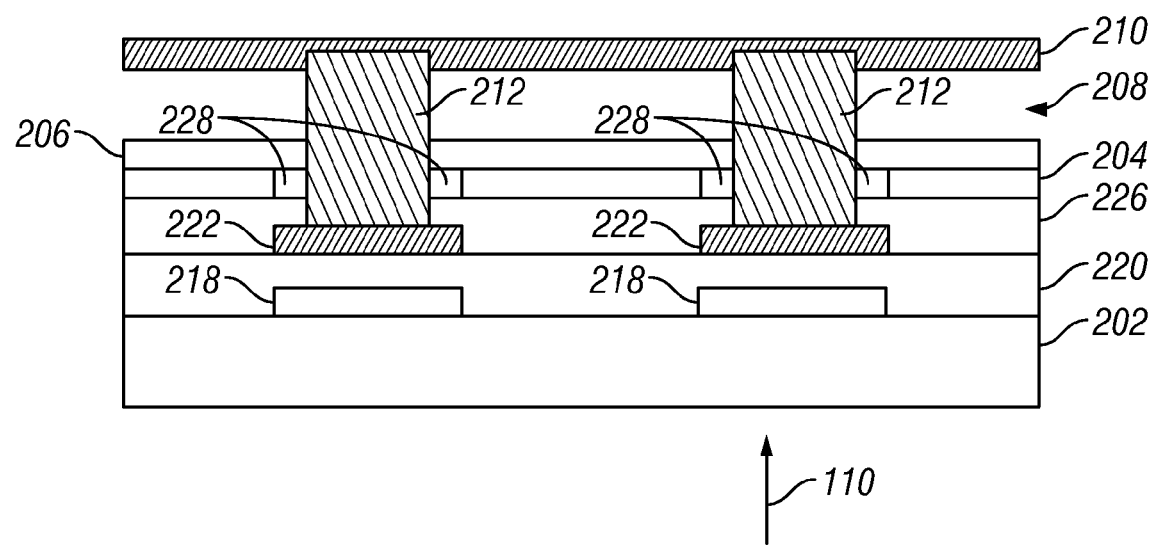
FIG. 17 is a cross-sectional view of a stage in the manufacture of a MEMS device having a conductive mask, illustrating the result of depositing a mechanical membrane onto the embodiment shown in FIG. 16 and removing a sacrificial layer to form an air gap.

FIG. 17 is a cross-sectional view of a stage in the manufacture of a MEMS device having a conductive mask, illustrating a mechanical membrane 210 deposited onto the embodiment shown in FIG. 16. The mechanical membrane 210 is deposited by sputter coating it onto the sacrificial layer 209. Thereafter, the sacrificial layer 209 is removed leaving an air gap 208. In one embodiment, the mechanical membrane 210 comprises an aluminum alloy. With the removal of the sacrificial layer 209, an air gap 208 is formed through which the mechanical membrane 516 moves when the interferometric modulator is actuated.

FIG. 17 also shows an embodiment of an electrical connection between the second reflective layer 222, the supports 212, and the mechanical membrane 210. Here, the conductive mask includes a dielectric stack that comprises a first reflective layer 218, an oxide layer 220, and a second reflective layer 222, that masks off non-active areas (for example, the supports 212) spaced apart from the active areas. In some embodiments, the conductive mask can comprise chrome, silver, aluminum or a dielectric stack so that one or more of the materials used to form the mask is capable of conducting electricity.

In this embodiment, the mask is a non-movable (e.g., static) interferometric element configured such that it causes the interference of light so that it reflects minimal light and appears black. The optical layer can be formed from ITO/Cr, ITO/Mo, ITO/Ti, Cr, Mo, Ti or other materials with similar properties. The dielectric layer is typically formed from $SiO_2$ or other dielectric materials, and the reflector is typically formed from aluminum, chromium or other metallic materials.

By fabricating the mask so that it comprises an electrically conductive material and using appropriately placed connections to a desired row and/or column electrode the mask can be used to reduce the resistance of the row and/or column electrode. For example, if a conductive mask, configured to always display black, is used in an array comprising a plurality of interferometric modulators, the conductive mask can be also be used as a conduction layer to decrease resistance of row and/or column electrodes that are used in the array to carry signals to the display elements aligned in rows and/or columns. In this embodiment, vias were created in the dielectric 226 to provide a recess for the support 212 and so it can connect to the second reflective layer 222, which is part of the conductive mask. It will be appreciated that there are many other possible embodiments to utilize a conductive mask. In some embodiments where the mask comprises a first conductive layer 218 and a second conductive layer 222, both conductive layers can be used as an electrical bus. In some embodiments, both conductive layers can be used as part of the same electrical bus. In other embodiments, the conductive layers are each used as part of separate electrical bus.

Figure 18:
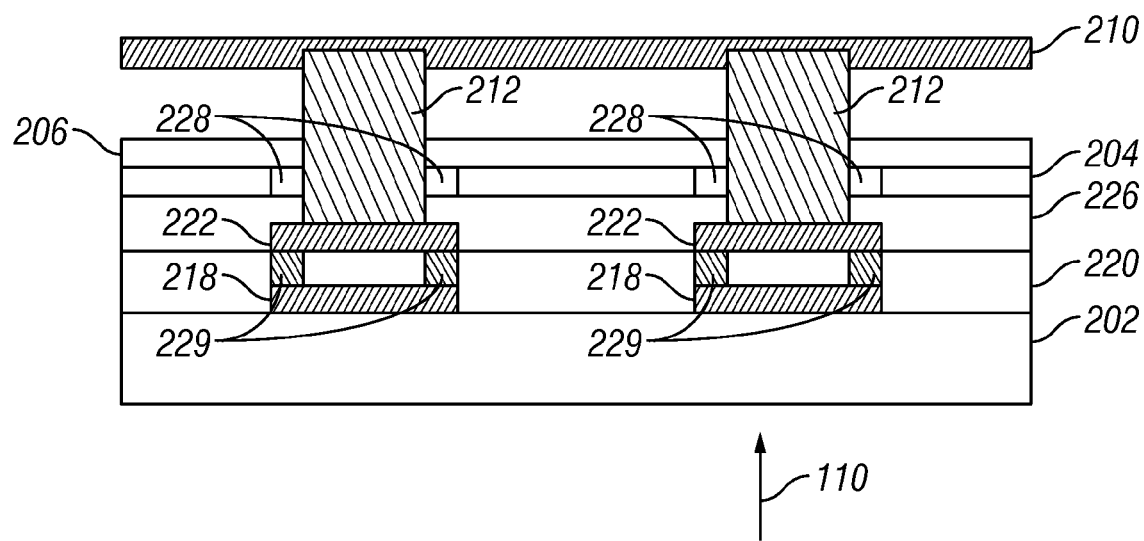
FIG. 18 is a cross-sectional view of a MEMS device illustrating an embodiment of a conductive mask where an electrically parallel connection is formed between both layers of the mask and a movable mechanical membrane.

FIGS. 18-22 show various exemplary embodiments of a conductive mask in an interferometric modulator to provide an electrically parallel connection to an electrode. The embodiments can be fabricated using similar techniques as described hereinabove for the embodiment shown in FIG. 17. The conductive masks illustrated in FIGS. 18-22 are configured as non-movable interferometric elements, that provide one or more electrically paralleled connections for application of voltages to the modulating element. FIG. 18 is a cross-sectional view of a MEMS device illustrating an embodiment of a conductive mask where an electrically parallel connection is formed between both layers of the mask and a movable mechanical membrane. In FIG. 18, the mask comprises the first reflective layer 218 and the second reflective layer 222. The mask forms an electrically parallel connection to the mechanical membrane 210, a portion of one of the electrodes in the interferometric modulator, as indicated by the diagonally-lined areas. The first reflective layer 218 is electrically connected to the second reflective layer 222 by connectors 229. The supports 212 are made of a conductive material, for example, one of the conductive materials described herein, and are connected to the second reflective layer 222. Electrical separators 228 electrically isolate the supports 212 from the electrode reflective layer 204. The supports 212 are connected to the movable mechanical membrane 210 so that the first reflective layer 218 and the second reflective layer 222 form an electrically parallel connection with the mechanical membrane 210.

Figure 19:
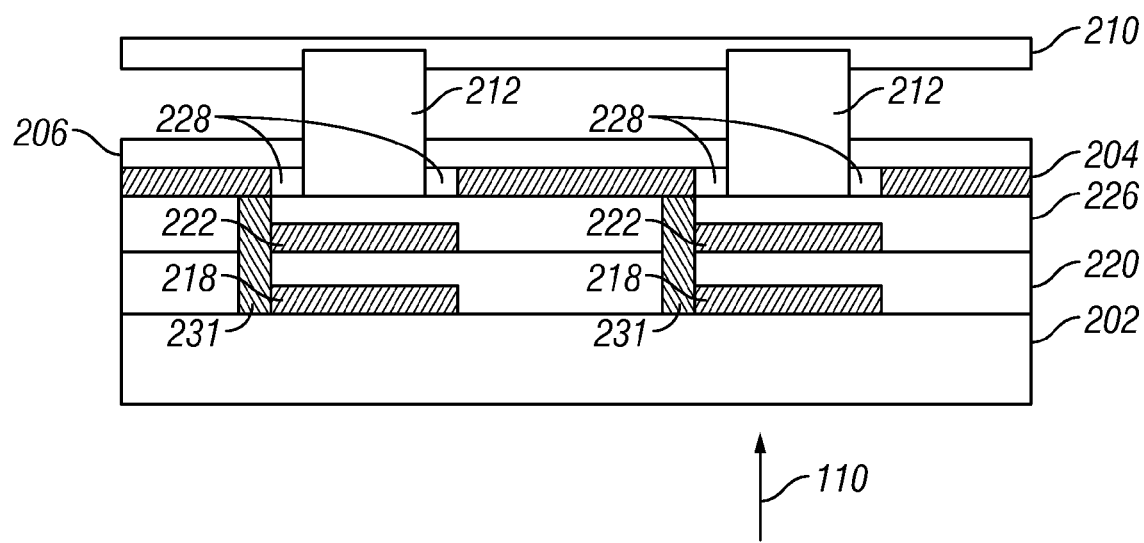
FIG. 19 is a cross-sectional view of a MEMS device illustrating an embodiment of a conductive mask where an electrically parallel connection is formed between both layers of the mask and a non-movable electrode layer.

FIG. 19 is a cross-sectional view of a MEMS device illustrating an embodiment of a conductive mask where an electrically parallel connection is formed between two conductive layers of a mask and the non-movable electrode layer 204. The first reflective layer 218 and the second reflective layer 222 form an electrically parallel connection to the electrode reflective layer 204, as indicated by the diagonally-lined areas. The first reflective layer 218 is electrically connected to the second reflective layer 222 by connectors 231, which also connect the first reflective layer 218 and the second reflective layer 222 to the electrode reflective layer 204. Electrical separators 228 electrically isolate the supports 212 from the electrode reflective layer 204.

Figure 20:
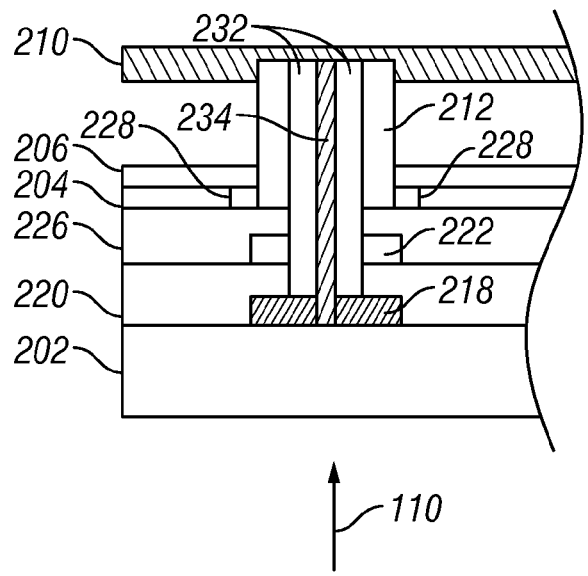
FIG. 20 is a cross-sectional view of a MEMS device illustrating an embodiment of a conductive mask where an electrically parallel connection is formed between a first reflective layer of the mask and a movable mechanical membrane.

FIG. 20 is a cross-sectional view of a MEMS device illustrating an embodiment of a conductive mask where an electrically parallel connection is formed between a first reflective layer 218 of the mask and the movable mechanical membrane 210. The first reflective layer 218 of the mask is electrically connected to the mechanical membrane 210 by the conductive connector 234 which runs through the support 212. The connector 234 is isolated from the support 212 and the second reflective layer 222 of the mask by electrical isolators 232, which are formed from a non-conductive material. Electrical isolators 228 isolate the support 212 from the electrode reflective layer 204. In embodiments where the support 212 is not formed from a conductive material, electrical isolators 232 and electrical isolators 228 may not be necessary to electrically isolate the support 212 from surrounding conductive material. In this embodiment, only the first reflective layer 218 forms an electrically parallel connection to the mechanical membrane 210.

Figure 21:
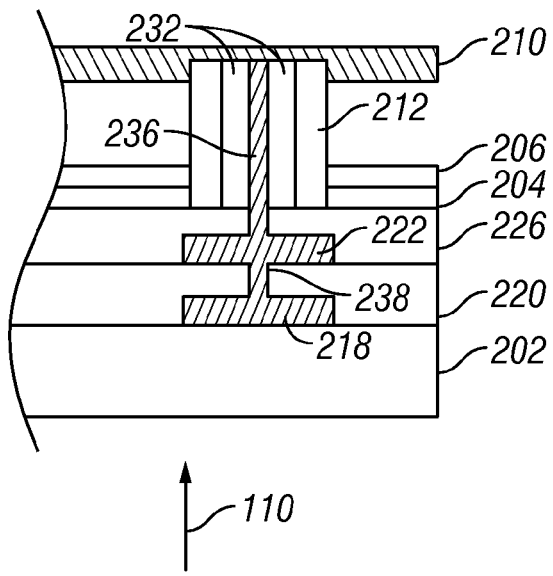
FIG. 21 is a cross-sectional view of a MEMS device illustrating an embodiment of a conductive mask where an electrically parallel connection is formed between a first and second reflective layer of the mask and a movable mechanical membrane.

FIG. 21 is a cross-sectional view of a MEMS device illustrating an embodiment of a conductive mask where an electrically parallel connection is formed between a first reflective layer 218, a second reflective layer 222 of the mask and a movable mechanical membrane 210. This embodiment is similar to the embodiment shown in FIG. 21, except that the first reflective layer 218 is connected to the second reflective layer 222 by the electrical connector 238. The first reflective layer 218 and the second reflective layer 222 are electrically connected to the mechanical membrane 210 by electrical connector 236, forming an electrical parallel connection between both layers of the conductive mask and the mechanical membrane 210. In this embodiment, the support 212 is not formed from a conductive material, thus isolators 232, although shown for clarity, would not be necessary to electrically isolate the support 212 from surrounding conductive material.

Figure 22:
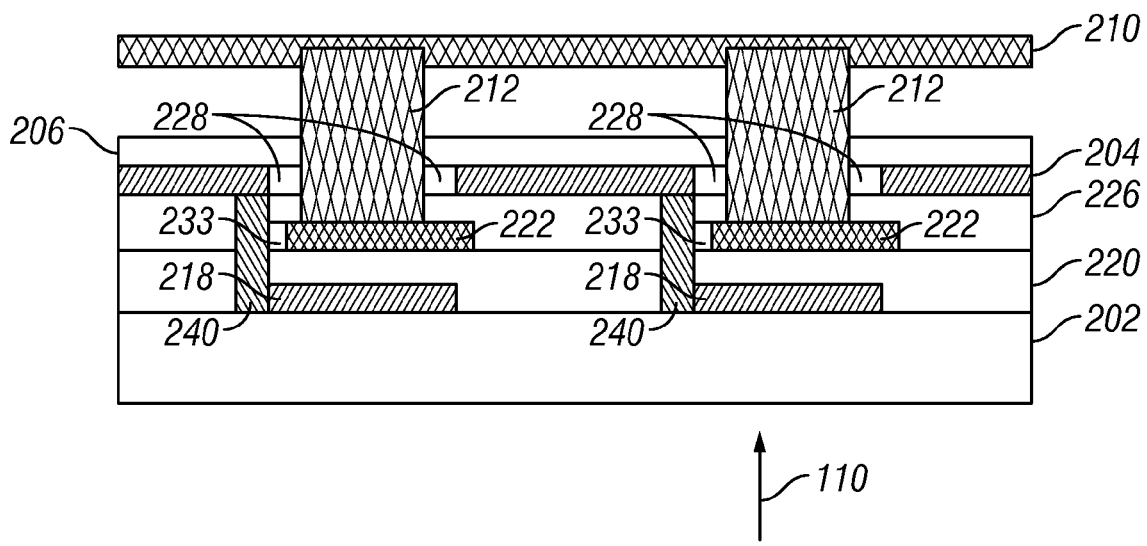
FIG. 22 is a cross-sectional view of a MEMS device illustrating an embodiment of a conductive mask where an electrically parallel connection is formed between a first reflective layer of the mask and a non-movable electrode layer and another electrically parallel connection is formed between a second reflective layer of the mask and a movable mechanical membrane.

FIG. 22 is a cross-sectional view of a MEMS device illustrating an embodiment of a conductive mask where an electrically parallel connection is formed between a first reflective layer 218 of the mask and the electrode layer 204, as indicated by the diagonally lined areas. Another electrically parallel connection is formed between a second reflective layer of the mask 222 and a movable mechanical membrane 210, as indicated by the cross-hatched areas. In FIG. 22, the first electrically parallel connection is formed by electrically connecting the first reflective layer 218 of the mask to the electrode layer 204 by electrical connectors 240. Electrical isolators 228 isolate the electrode layer 204 from the conductive support 212. Electrical isolators 233 isolate the electrical connector 240 from the second reflective layer 222 of the mask. The second electrically parallel connection is formed by connecting the second reflective layer 222 of the mask to the support 212, which is connected to the mechanical membrane 210.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

The invention claimed is:

1. A display, comprising:
   an array including a plurality of optoelectronic devices, the array including one or more non-active areas that do not display data;
   an electrically-conductive first mask disposed to absorb or attenuate light in a first non-active area of the array, at least a portion of the first mask coupled to at least one optoelectronic device to provide an electrical path between the first mask and the at least one optoelectronic device, the first mask including a first reflective layer spaced from a second reflective layer by a layer therebetween; and
   an electrically-conductive second mask disposed to absorb or attenuate light in a second non-active area of the array, at least a portion of the second mask coupled to the at least one optoelectronic device to provide an electrical path between the second mask and the at least one optoelectronic device, the second mask including a first reflective layer spaced from a second reflective layer by a layer therebetween.

2. The display of claim 1, wherein the first mask and second mask are configured to minimize reflected light.

3. The display of claim 1, wherein the first mask and second mask are configured to reflect light of a selected color.

4. The display of claim 1, wherein at least one of the first non-active area and the second non-active area is laterally offset from an active area of the array that displays data.

5. The display of claim 1, wherein the at least one optoelectronic device includes a stationary reflective layer and a movable reflective layer configured to be driven toward the stationary reflective layer in response to a voltage applied to the at least one optoelectronic device.

6. The display of claim 5, wherein at least one of the first reflective layer and the second reflective layer of the first mask is electrically coupled to the stationary reflective layer of the at least one optoelectronic device to apply a voltage to the stationary reflective layer.

7. The display of claim 5, wherein at least one of the first reflective layer and the second reflective layer of the second mask is electrically coupled to the movable reflective layer of the at least one optoelectronic device to apply a voltage to the movable reflective layer.

8. The display of claim 5, wherein the first non-active area and the second non-active area include at least one of:
   a row cut between two or more of the optoelectronic devices of the array;
   a support disposed between the movable reflective layer and the stationary reflective layer of the at least one optoelectronic device;
   a portion of the movable reflective layer that bends when the movable reflective layer is driven toward the stationary reflective layer of the at least one optoelectronic device; and
   an area between movable reflective layers of adjacent optoelectronic devices of the array.

9. The display of claim 1, further comprising:
   a processor that is configured to communicate with the display, the processor being configured to process image data; and
   a memory device that is configured to communicate with the processor.

10. The display of claim 9, further comprising:
    a driver circuit configured to send at least one signal to the display; and
    a controller configured to send at least a portion of the image data to the driver circuit.

11. The display of claim 9, further comprising:
    an image source module configured to send the image data to the processor, wherein the image source module includes at least one of a receiver, transceiver, and transmitter; and
    an input device configured to receive input data and to communicate the input data to the processor.

12. A method of manufacturing a display including an array of optoelectronic devices formed on a substrate having a first area and a second area, each of the optoelectronic devices including at least one active optical component configured to display data, the method comprising:
    fabricating a conductive first mask over the first area, at least a portion of the first mask electrically connected to the at least one active optical component of each of the optoelectronic devices, the first mask configured to interferometrically modulate light; and
    fabricating a conductive second mask over the second area, at least a portion of the second mask electrically connected to the at least one active optical component of each of the optoelectronic devices, the second mask configured to interferometrically modulate light.

13. The method of claim 12, wherein the first mask and the second mask each include a first reflective layer spaced from a second reflective layer.

14. The method of claim 12, wherein the at least one active optical component includes a movable reflective layer and a stationary reflective layer spaced from the movable reflective layer.

15. The method of claim 12, wherein at least one of the first area and the second area is laterally offset from the at least one active optical component of each optoelectronic device.

16. A display comprising:
    a plurality of optoelectronic devices,
    first means for reducing light in a first inactive area that is configured to not display data, the first light-reducing means electrically coupled to at least one optoelectronic device of the plurality of optoelectronic devices to provide an electrical path between the first light-reducing means and the at least one optoelectronic device, the first light-reducing means including
      first means for reflecting light,
      second means for reflecting light, and
      means for spacing the first light-reflecting means of the first light-reducing means and the second light-reflecting means of the first light-reducing means; and
    second means for reducing light in a second inactive area that is configured to not display data, the second light-reducing means electrically coupled to the at least one optoelectronic device to provide an electrical path between the second light-reducing means and the at least one optoelectronic device, the second light-reducing means including
      first means for reflecting light,
      second means for reflecting light, and
      means for spacing the first light-reflecting means of the second light-reducing means and the second light-reflecting means of the second light-reducing means.

17. The display of claim 16, wherein the first light-reducing means includes a first mask, or wherein the second light-reducing means includes a second mask, or wherein the first light-reflecting means of the first light-reducing means includes a first reflective layer, or wherein the second light-reflecting means of the first light-reducing means includes a second reflective layer, or wherein the spacing means of the first light-reducing means includes a layer of material, or wherein the first light-reflecting means of the second light-reducing means includes a first reflective layer, or wherein the second light-reflecting means of the second light-reducing means includes a second reflective layer, or wherein the spacing means of the second light-reducing means includes a layer of material.

18. The display of claim 16, wherein the first light-reducing means and the second light-reducing means are configured to reflect light of a selected color.

19. The display of claim 16, wherein the at least one optoelectronic device includes a stationary reflective layer and a movable reflective layer configured to be driven toward the stationary reflective layer in response to a voltage applied to the at least one optoelectronic device.

20. The display of claim 19, wherein at least one of the first light-reflecting means and the second light-reflecting means of the first light-reducing means is electrically coupled to the stationary reflective layer and wherein at least one of the first light-reflecting means and the second light reflecting means of the second light-reducing means is electrically coupled to the movable reflective layer.

* * * * *